United States Patent [19]
Takada et al.

[11] Patent Number: 5,430,585
[45] Date of Patent: Jul. 4, 1995

[54] MAGNETIC RECORDING-REPRODUCTION APPARATUS HAVING A TAPE TENSION CONTROL SLIDE MOVABLE IN A CIRCULAR MOTION

[75] Inventors: Masahiko Takada, Hirakata; Takahiro Okuie, Nara; Osamu Takao, Kobe; Haruhiko Yoneda, Toyonaka; Akihiro Suzuki, Nishinomiya, all of Japan

[73] Assignee: Sanyo Electric Co., Ltd., Moriguchi, Japan

[21] Appl. No.: 247,752

[22] Filed: May 23, 1994

[30] Foreign Application Priority Data

| May 21, 1993 | [JP] | Japan | 5-119468 |
| May 24, 1993 | [JP] | Japan | 5-121138 |
| May 27, 1993 | [JP] | Japan | 5-125631 |
| Jun. 29, 1993 | [JP] | Japan | 5-159513 |
| Jul. 28, 1993 | [JP] | Japan | 5-185777 |

[51] Int. Cl.⁶ .............................. G11B 5/027
[52] U.S. Cl. ........................................ 360/85
[58] Field of Search ............... 360/85, 85, 96.3–96.4; 242/334, 334.6

[56] References Cited

U.S. PATENT DOCUMENTS 4,951,164  8/1990  Yasaka et al.
5,172,283 12/1992  Fukuyama ........................ 360/85

FOREIGN PATENT DOCUMENTS 62-154255  7/1987  Japan.
1-220164   9/1989  Japan.
1-220165   9/1989  Japan.

*Primary Examiner*—A. J. Heinz
*Attorney, Agent, or Firm*—Armstrong, Westerman, Hattori, McLeland & Naughton

[57] ABSTRACT

A chassis is slidably provided with a circular-arc control slide bulging toward a rotary cylinder and having projections spaced apart from each other. Reel supports and a reel drive mechanism are arranged on the curving-in side of the slide. Disposed on the path of movement of the slide is a drive cam gear formed with cam grooves each extending from an outer peripheral opening toward its center. The slide is formed thereon with a toothed projection which meshes with the cam gear during a period after one of the projections is fitted in the corresponding cam groove and until the other projection is fitted in the corresponding cam groove. The slide is further formed with a cam groove having engaged therein a soft brake lever for giving a light load to the reel support in REV mode, a brake lever for lightly braking a capstan motor in SLOW mode, a tension regulator lever for lightly braking the reel support in FF/REW mode, and a withdrawing lever for withdrawing a magnetic tape from a cassette for loading to operate these levers.

10 Claims, 33 Drawing Sheets

FIG. 18A
FIG. 18B
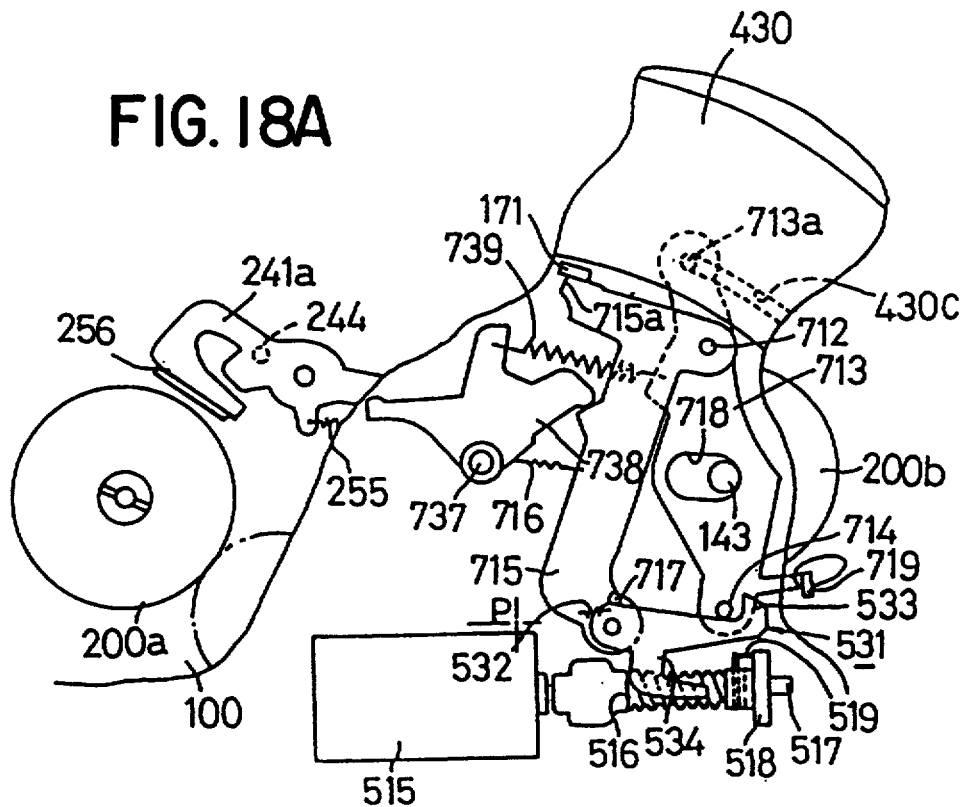
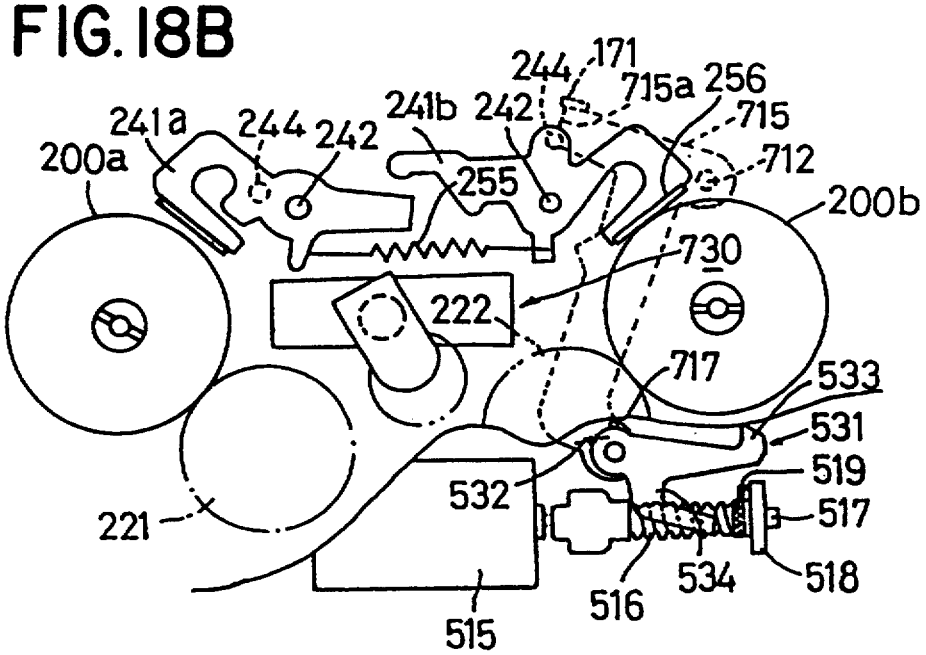

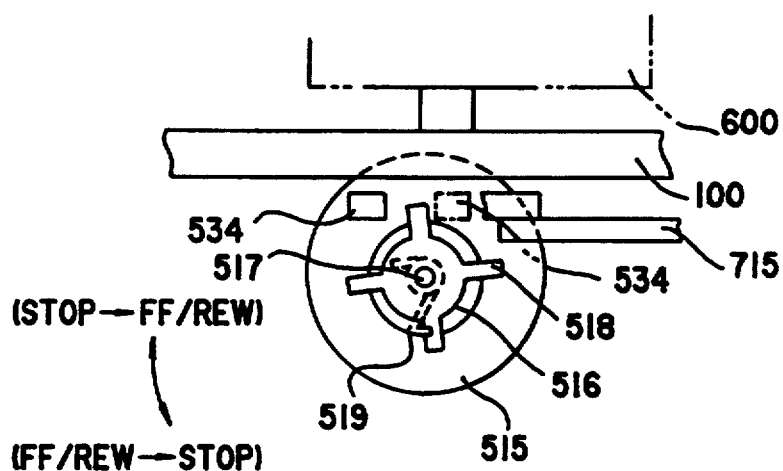
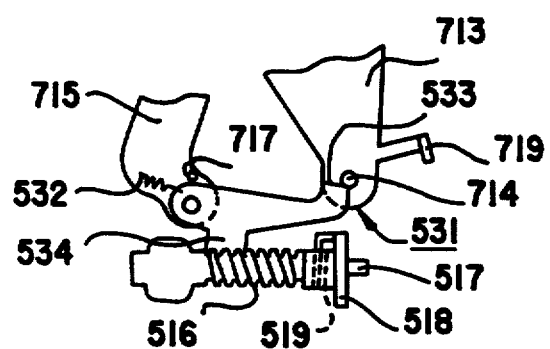
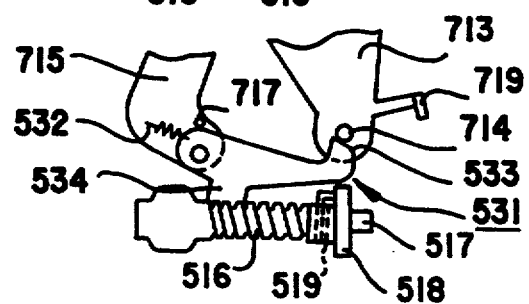
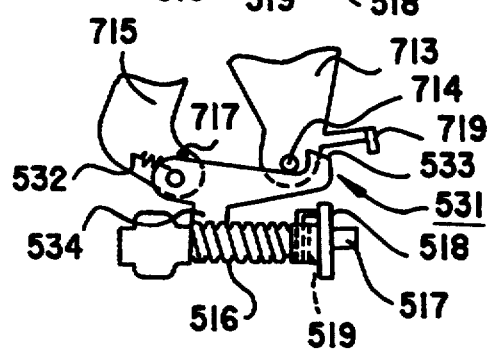

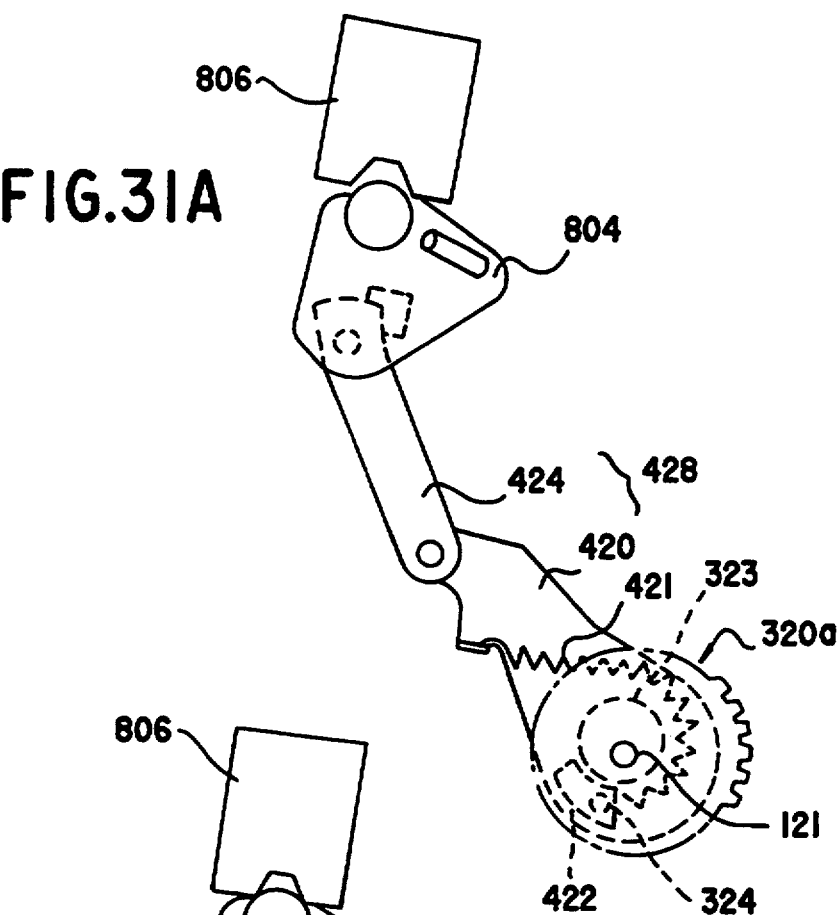
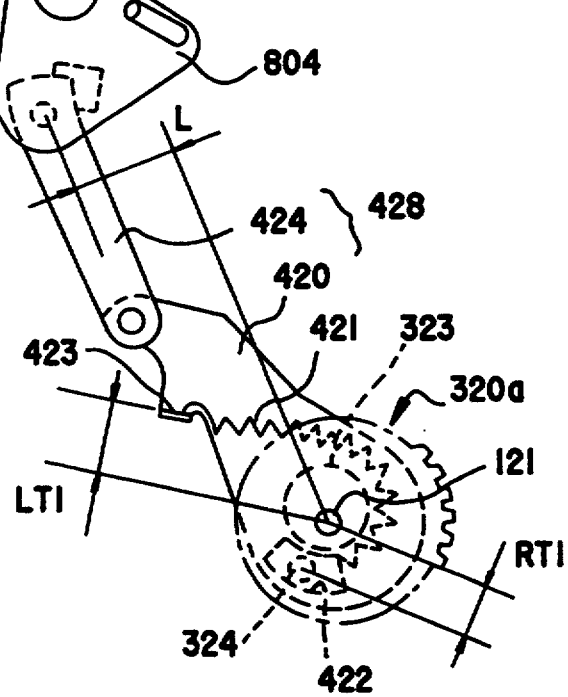
FIG.31A
FIG.31B

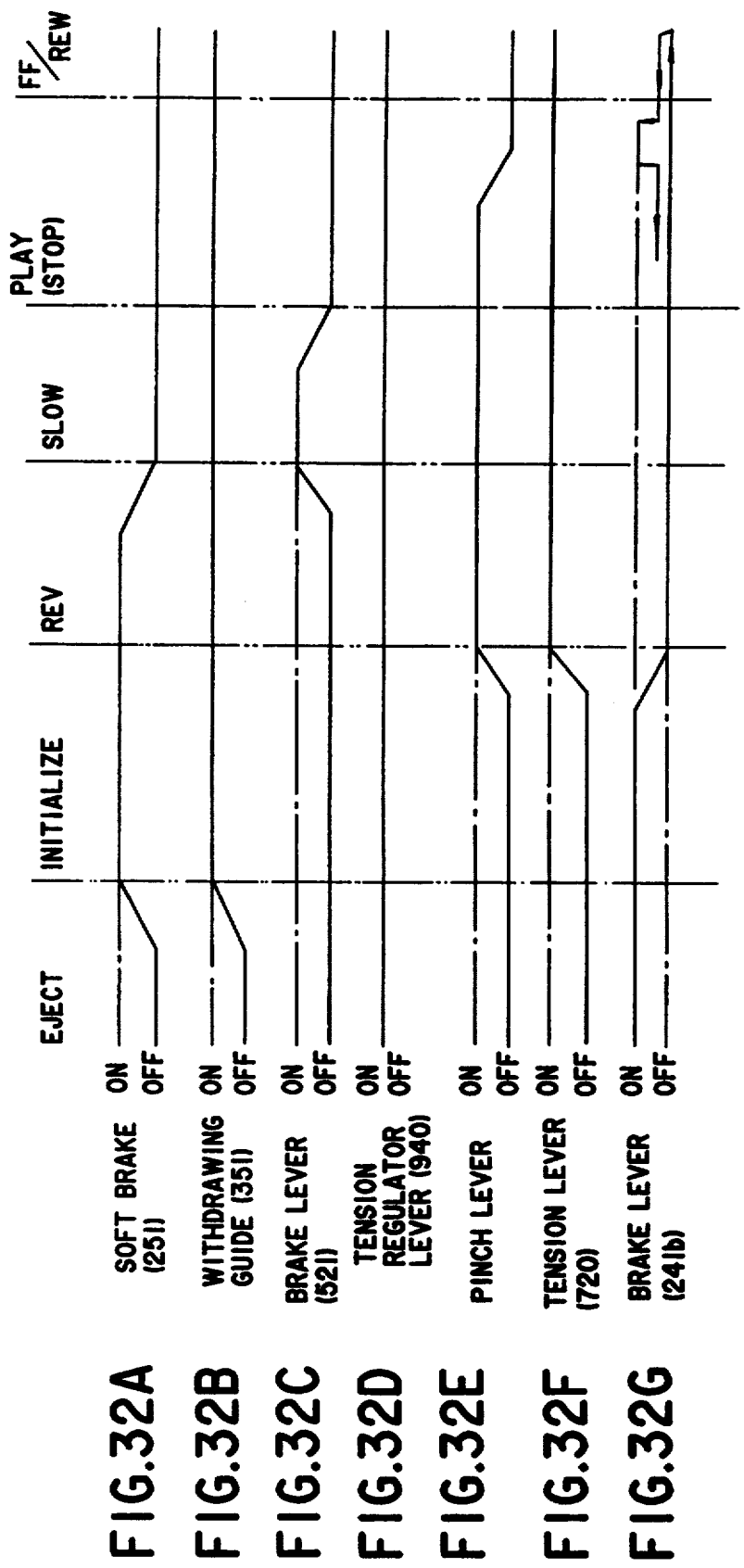

MAGNETIC RECORDING-REPRODUCTION APPARATUS HAVING A TAPE TENSION CONTROL SLIDE MOVABLE IN A CIRCULAR MOTION

FIELD OF THE INVENTION

The present invention relates to recording-reproduction apparatus for recording and reproducing signals with use of a magnetic tape, and more particulary to tape loading and a loading drive mechanism.

BACKGROUND OF THE INVENTION

Conventional recording-reproduction apparatus of the type mentioned wherein a magnetic tape is used include the one disclosed in Unexamined Japanese Patent Publications HEI 1-220164 and HEI 1-220165. The present invention provides an improvement over this conventional apparatus, so that the conventional apparatus will be described first briefly. In the following description, the direction in which the cassette is loaded into the apparatus will be referred to as the "front," and the direction of unloading of the cassette as the "rear."

With reference to FIGS. 33 to 38B, the apparatus has a rotary cylinder 800 and a pair of reel supports 200a, 200b which are mounted on a chassis 100. The reel support 200a on the supply side has a band 722 wound therearound. The band 722 has one end attached to the chassis 100 and another end attached to a tension lever 720 which is movable about a pivot 725 on the chassis 100. The tension lever 720 is biased counterclockwise by a spring 723 into pressing contact with a leading guide block 804 for withdrawing a magnetic tape from a cassette.

Disposed in the rear of the two reel supports 200a, 200b is a control slide 830 which is sliable rightward and leftward. A bell crank 831 in contact with a cam portion 830a of the control slide 830 causes a lever 832 to move the tension lever 720 with the sliding movement of the control slide 830. The slide 830 has a right end linked to a control plate 811 slidable forward and rearward on the chassis 100. The control plate 811 is connected to an intermediate plate 815 provided on the rear side of the chassis 100. A pin 812 extending upward from the intermediate plate 815 is fitted in a cam groove 444 of a first cam gear 440 provided at a front end portion of the chassis 100 on the rear side thereof.

The reel supports 200a, 200b mesh respectively with intermediate gears 221, 222, and brake levers 241a, 241b bear on these gears 221, 222, respectively. A spring 255 causes the brake levers 241a, 241b to give a braking load to the intermediate gears 221, 222.

One end of a slide piece 932 positioned between the control slide 830 and the upper surface of the chassis 100 is opposed to one of the brake levers, 241b. The slide piece 932 is perpendicular to and engaged with an intermediate slide 931 interposed between the chassis 100 and the control plate 811. The slide 931 is in contact with an intermediate lever 930, which in turn is in contact with a clutch unit 340 slidable rightward and leftward on the chassis 100. The clutch unit 340 is disposed on the front side of the chassis 100 opposite to the first cam gear 440. Disposed in front of the clutch unit 340 is a pulley 518 which is rotatable by a motor 515 by means of a belt. The rotation of the pulley 518 is transmitted to the first cam gear 440 by a mechanism which will not be described.

The first cam gear 440 is in mesh with a second cam gear 810 having a cam groove 813a, in which one end of a rack bar 321 is engaged. The rack bar 321 is in mesh with a drive gear 320b coupled to a leading guide block 804 at right by a link mechanism 428. Similarly, the leading guide block 804 at left has a link mechanism 428 connected thereto and a drive gear 320a coupled thereto.

With reference to FIG. 37A showing the clutch unit 340, a slide plate 341 has mounted thereon a clutch lever 349 rotatable along a plane perpendicular to the chassis 100, and a pin 346 which is slidable upward and downward. The pin 346 extends through the chassis 100 and is fitted in a vertical cam groove (not shown) in the first cam gear 440. The clutch unit 340 is biased leftward by a spring 142. In EJECT mode, the unit 340 is in pressing contact with a stopper 141 on the chassis 100, and a pawl 348 at the free end of the clutch lever 349 is positioned at the left of a projecting shaft 517 of the pulley 518.

When a cassette is loaded into the apparatus, the apparatus is first set in STOP mode as shown in FIG. 35. The cam gears 440, 810 rotate in operative relation with the motor 515, and the rack bar 321 slides obliquely rightward to rotate the drive gear 320b in a tape withdrawing direction. The leading guide blocks 804, 804 withdraw a magnetic tape 601 and press the tape against catchers 806 provided in front of the rotary cylinder 800.

With the rotation of the motor 515, the pulley 518 rotates clockwise, causing the intermediate plate 815 and the control plate 811 to slidingly move the control slide 830 leftward. The bell crank 831 in engagement with the cam portion 830a causes the lever 832 to bear against a base end portion of the tension ever 720 to restrain the rotation of the lever 720 by the spring 723 and slacken the bank 722. A guide pin 721 provided upright on the forward end of the tension lever 720 reaches a position a small distance away from the magnetic tape 601.

When STOP mode is changed over to FF/REW mode in which the magnetic tape 601 is forwarded fast or rewound, the first cam gear 440 causes the pin 346 to push the clutch unit 340 rightward against the spring 142. The clutch unit 340 pushes the slide piece 932 leftward through the intermediate lever 930 and the intermediate slide 931. With reference to FIG. 37B, the pin 346 is forced upward as the pin slides along the vertical cam groove, rotating the clutch lever 349 counterclockwise about its pivot. Upon the pawl 348 reaching the right side of the projecting shaft 517, the pin 346 is released from the cam groove and descends, and the clutch unit 340 is forced leftward by the spring to engage the pawl 348 with the shaft 517 as shown in FIG. 38A.

With reference to FIG. 36, the brake lever 241b rotates about its pivot by being pushed by the slide piece 932 and kicks up the other brake lever 241a, with the result that the two levers 241a, 241b are moved away from the intermediate gears 221, 222. The tension lever 720 is in the same position as in STOP mode.

When FF/REW mode is changed over to STOP mode, the pulley 518 rotates counterclockwise with the rotation of the motor 515. Owing to the friction between the shaft 517 and the pawl 348, the clutch lever 349 rotates upward about its pivot, releasing the pawl 348 from the shaft 517 (see FIG. 37B), whereupon the clutch unit 340 is returned by the spring 142.

The clutch unit 340 releases the intermediate lever 930 from contact therewith, permitting the spring 255 on the brake levers 241a, 241b to return the slide piece 932 and the intermediate slide 931 to their stand-by position. Instantaneously the brake levers 241a, 241b come into contact with the respective intermediate gears 221, 222, thus exerting a braking force on the reel supports 200a, 200b instantaneously upon a change-over from FF/REW mode to STOP mode. The braking force thus instantaneously given prevents the reel support 200b from being rotated by inertia in STOP mode and the magnetic tape 601 from slackening.

When STOP mode is changed over to PLAY mode for the reproduction of record, the control slide 830 slidingly moves leftward, releasing the bell crank 831 from engagement with the control slide 830 and permitting the tension lever 720 to rotate counterclockwise to tension the band 722, whereby a predetermined load of rotation is given to the take-up reel support 200b. This imparts suitable tension to the magnetic tape 601 to enable the tape 601 to travel smoothly. As seen in FIG. 38B, the clutch unit 340 further slides rightward to move the pawl 348 away from the projecting shaft 517.

However, the recording-reproduction apparatus has the following problems.

1. Since the single pin 812 engaging with the first cam gear 440 slidingly moves the control plate 811, an attempt to increase the length of sliding stroke of the control plate 811 and the control slide 830 requires an increase in the size of the first cam gear 440. Because the control slide 830 is made movable rightward and leftward on the chassis 100, the increase in the stroke length of the plate 811 and the slide 830 results in an increase in the size of the chassis 100, consequently presenting difficulty in fulfilling the requirement in recent years that recording-reproduction apparatus be made smaller.

2. The meshing engagement of the drive gear 320b with the rack bar 321 invariably involves a backlash resulting from the machining process as is well known. The leading guide block 804 is biased forward by the tension lever 720 and is therefore pushed forward by an amount corresponding to the backlash in EJECT mode. If the backlash is great owing to variations in the accuracy of machining drive gears 320a, it is likely that the magnetic tape 601 will be damaged by being caught by the guide block 804 when the cassette is loaded onto the chassis 100.

3. For the toothed periphery of the drive gear 320a to withstand a great force exerted thereon when the guide block 804 is pressed against the catcher 806 for tape loading, the gear needs to have an increased module. However, the increased module causes the rack bar 321 to backlash greatly to displace the guide block 804 forward, giving rise to the same problem as above.

4. The powder of the first cam gear 440 is transmitted to the tension lever 720 by way of the control plate 811, control slide 830, bell crank 831 and lever 832, so that the tension lever 720 is slow in responding to the rotation of the first cam gear 440. This presents difficulty in effecting delicate control of operation timing.

5. In EJECT mode, the spring 723 is tensioned to the greatest extent by the tension lever 720, so that the control slide 830 is subjected to a greater load than in PLAY mode and encounters difficulty in sliding smoothly.

6. When the brake lever 241b is instantaneously brought into contact with the intermediate gear 222 in engagement with the reel support 200b upon a change-over from FF/REW mode to STOP mode, the clutch unit 340 instantaneously moves leftward into striking contact with the stopper 141. Accordingly, the resilient restoring force of the spring 142 acts directly on the stopper 141, so that the impact noise produced by the collision of the clutch unit 340 therewith is great, has a high frequency and sounds disagreeable. The impact noise may be mitigated by covering the stopper 141 with a rubber or like shock absorber, whereas this adds to the number of components.

SUMMARY OF THE INVENTION

An object of the present invention is to provide a magnetic recording-reproduction apparatus wherein the slide for controlling the operation of the tension lever is made slidable over an increased stroke length without varying the size of the chassis to compact the apparatus as required.

Another object of the present invention is to lessen the load to be applied to the slide in EJECT mode so as to render the slide movable smoothly.

Another object of the present invention is to provide a drive gear which is useful for diminishing the variations in the position of the leading guide block in EJECT mode and which withstands a great force to be exerted thereon when the leading guide block is pressed against the catcher.

Still another object of the present invention is to mitigate the impact noise to be produced when a member for actuating the brake levers strikes against a stopper upon a change-over from FF/REW mode to STOP mode without using any shock absorber for the stopper.

The recording-reproduction apparatus embodying the present invention has a control slide in the form of a circular arc and rotatable about a central point P. Accordingly, even if the control slide is given an increased length of sliding stroke, the chassis need not have a larger size. Since the control slide is bulged toward the rotary cylinder, the drive mechanism can be disposed on the curving-in side of the slide to ensure effective use of the space provided by the chassis.

When to be slidingly moved, the control slide is first rotated about the central point (phantom point) P by one of two projections on the slide fitted in a drive cam gear, and the other projection is thereafter fitted in the drive cam gear. The control slide can therefore be given an increased length of sliding storke without necessitating a larger drive cam gear.

Further during the period after one of the projections is fitted in the drive cam gear and until the other projection is fitted in the cam gear, a toothed projection on the control slide is brought into meshing engagement with the drive cam gear to assist in the sliding movement. This alleviates the load on the drive cam gear, permitting the control slide to move smoothly.

When the loading guide block is pressed against the catcher, a large tooth of a drive gear meshes with a large rack tooth of the control slide. This enables the drive gear to withstand the force exerted thereon by the guide block pressed against the catacher.

The brake lever is operated by a pivotal lever supported on the chassis. Accordingly, a stopper for the pivotal lever can be provided at an optional position within the range of rotation of the pivotal lever. The stopper can therefore be disposed at such a position that the impact load to be exerted on the stopper is small and will not produce a noise which sounds disagreeable. This obviates the need to cover the stopper with a shock absorber.

BRIEF DESCRIPTION OF THE DRAWINGS

FIGS. 18A and 18B are plan views partly broken away and showing a brake lever in EJECT mode;

FIG. 22 is a side elevation of a motor and a fin;

FIGS. 23A, 23B and 23C are views showing the engagement of the latch lever with an operation lever;

FIG. 31A is a plan view showing the leading guide block in contact with the catcher;

FIG. 31B is a plan view showing the guide block in pressing contact with the catcher;

FIG. 32 is an operation timing chart of guide parts and brake levers;

DETAILED DESCRIPTION OF EMBODIMENT

Figure 1:
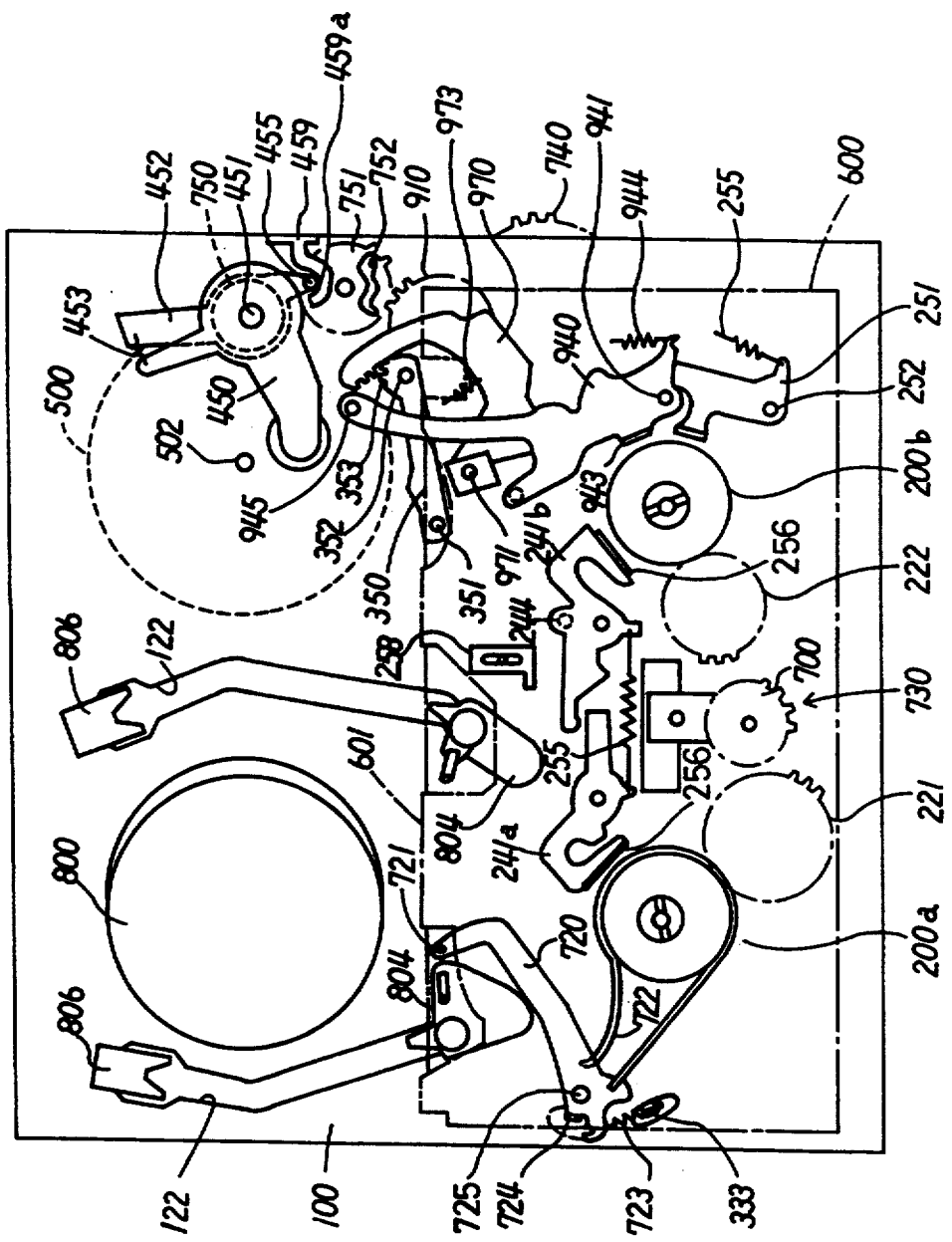
FIG. 1 is an overall plan view of a recording-reproduction apparatus.
Figure 2:
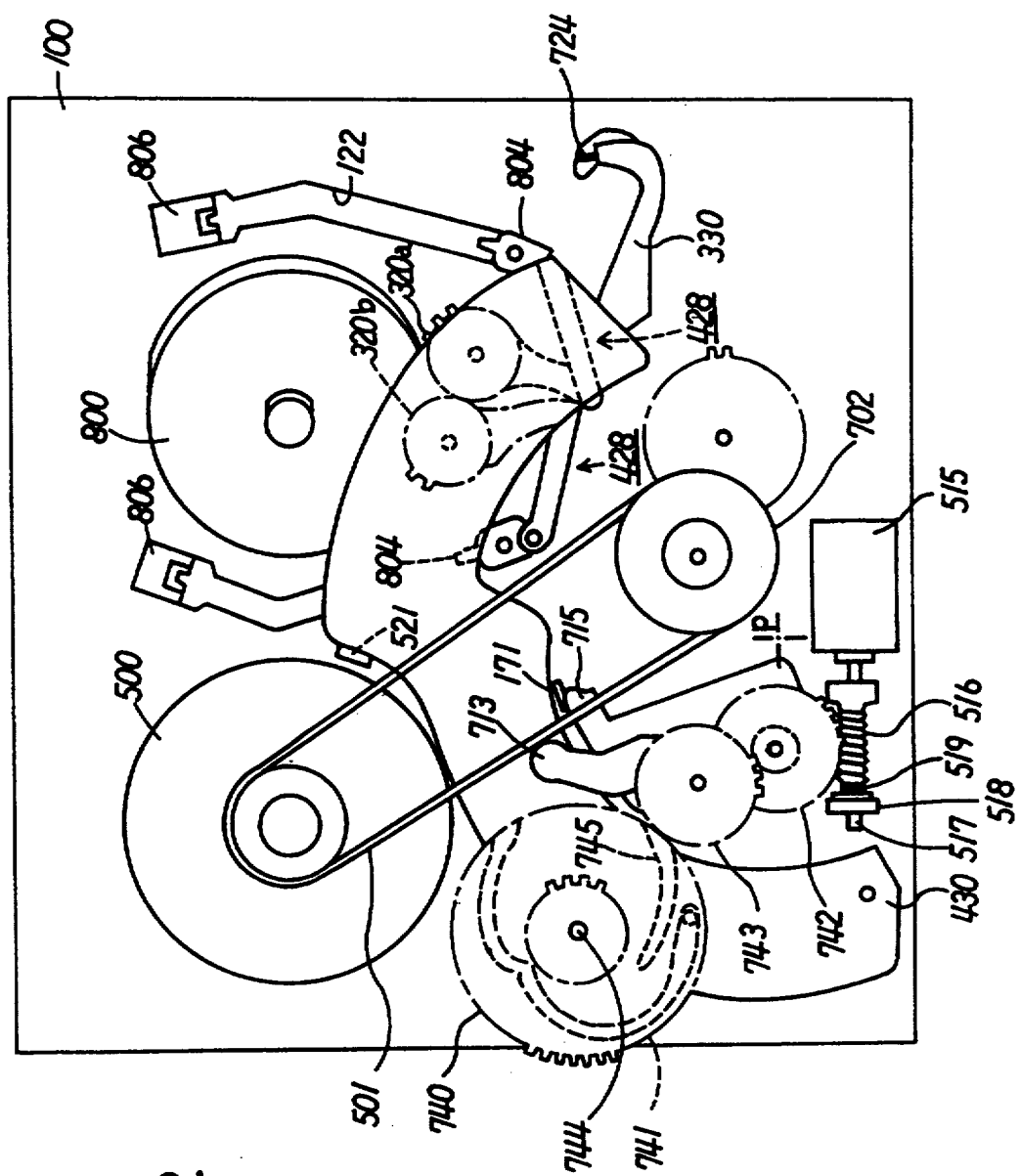
FIG. 2 is an overall rear view of the same.
Figure 3:
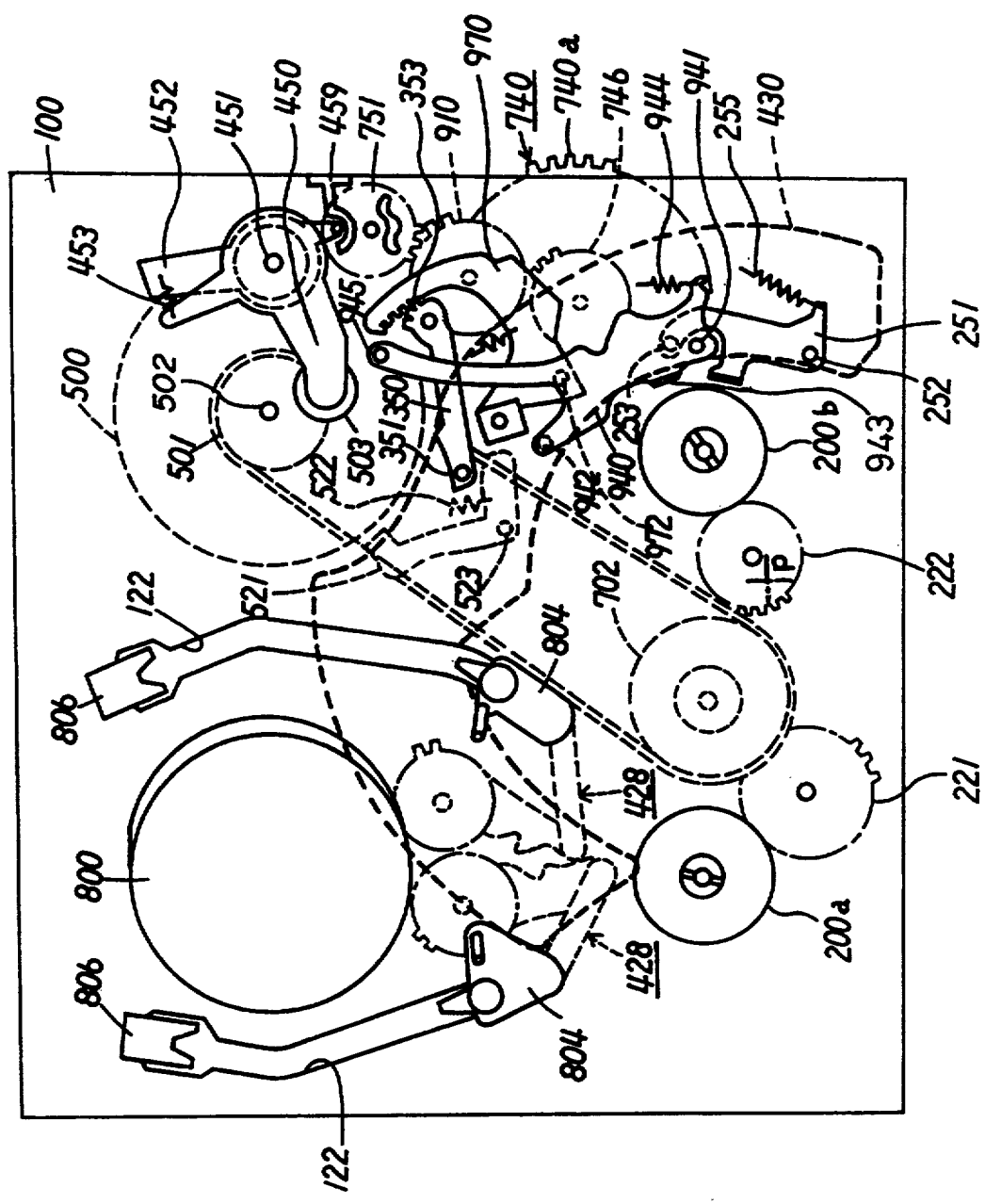
FIG. 3 is a plan view showing the relationship in position between guide parts provided on the surface of a chassis and a control slide.
Figure 4:
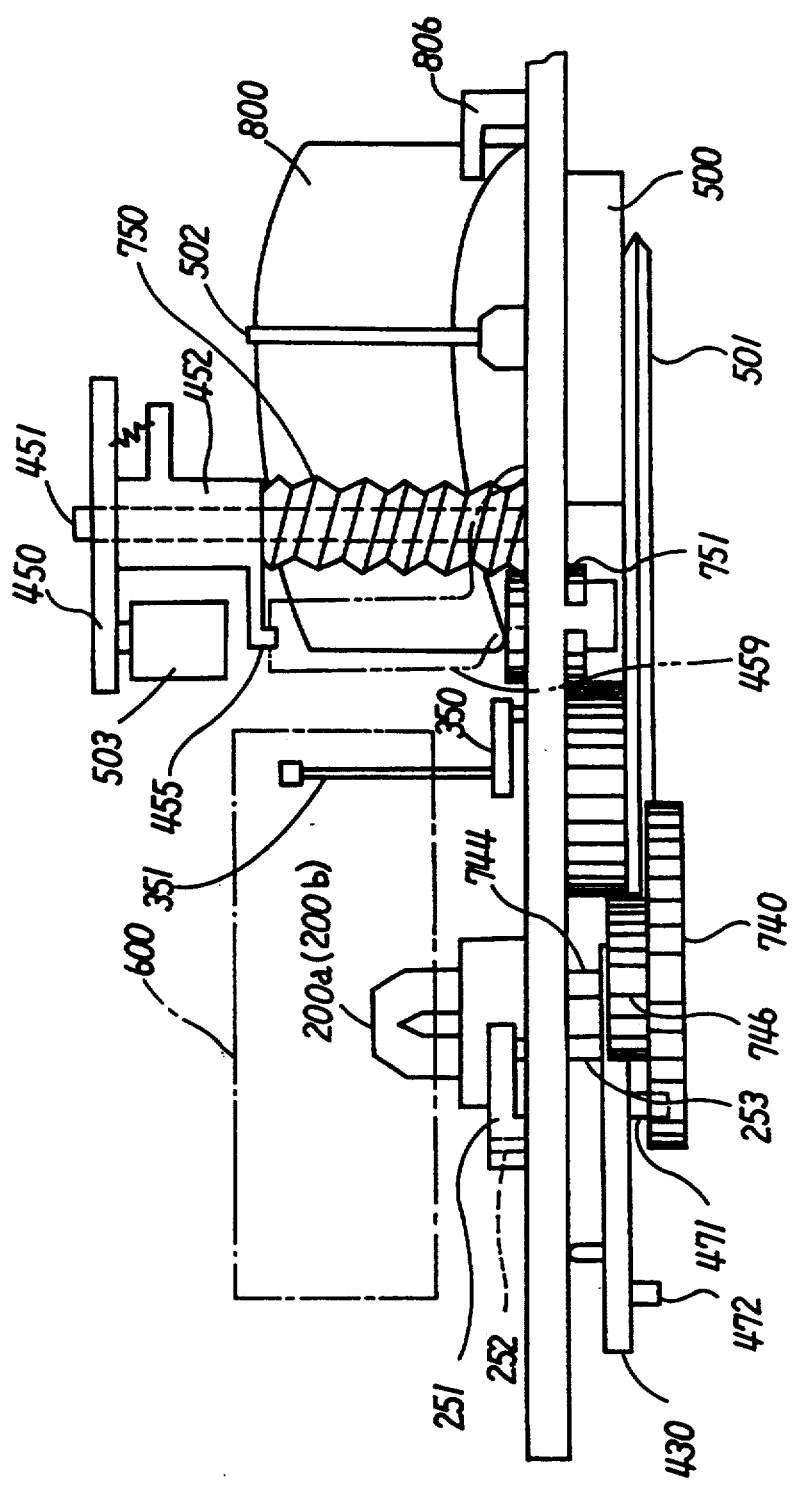
FIG. 4 is a right side elevation of the recording-reproduction apparatus.

A recording-reproduction apparatus for use with magnetic tapes will be described below item by item. The mechanisms will be described with respect to their constructions, operations and advantages. In the following description, FIG. 2 only is a view of the apparatus as it is seen from the rear side of a chassis 100, and the other drawings show the apparatus as viewed from the front side of the chassis 100.

Brief Description of Overall Apparatus (see FIGS. 1 to 4, 18A and 18B)

Arranged on the chassis 100 are reel supports 200a, 200b, rotary cylinder 800, leading guide blocks 804, 804 and tension lever 720 as in conventional apparatus. The position of a cassette 600 as loaded in place is indicated in a dot-and-dash line. Arranged inside this position are a guide 351 for withdrawing a magnetic tape 601 from the cassette 600, and a guide pin 721 mounted on one end of the tension lever 720. Outside the cassette position, a capstan shaft 502 is disposed at the right of the rotary cylinder 800.

A withdrawing lever 350 has a base end rotatably fitted to a pivot 352 on the chassis 100 and a free end carrying the withdrawing guide 351 in an upright position. The lever 350 has a toothed portion 353 at its base end. The toothed portion 353 is in mesh with the forward end of an operation lever 970 rotatably fitted to a pivot 971, and is movable with the rotation of the operation lever 970. A pin 972 extends from one end of the lever 970 loosely through the chassis 100. The operation lever 970 is biased counterclockwise by a tension spring 973.

A tension regulator lever 940 extending over the operation lever 970 is rotatably mounted on a pivot 941 on the chassis 100 and has a free end carrying an upright regulator pin 945. A pin 942 positioned between the pivot 941 and the regulator pin 945 extends downward from the lever 940 loosely through the chassis 100. The tension regulator lever 940 is biased toward the reel support 200b on the take-up side by a tension spring 944. The lever 940 has affixed to a side portion thereof a pad 943 adapted to bear on the side face of the take-up reel support 200b. As will be described later, the tension regulator lever 940 brings the regulator pin 945 into contact with the magnetic tape 601 and the pad 943 into contact with the take-up reel support 200b in FF/REW mode to regulate the tension on the tape 601. The regulator pin 945 is positioned outside the loaded position of the cassette 600 at all times.

Disposed beside the take-up reel support 200b is a soft brake lever 251 biased toward the support 200b by a spring 255. A projection 253 extends downward from one end of the lever 251 loosely through the chassis 100. A brake lever 521 pivotally supported at one side of a capstan motor 500 on the rear side of the chassis 100 is biased toward the motor 500 by a spring 522 and has a projection 523 extending downward from an end portion thereof.

A band 722 wound around the reel support 200a on the supply side has opposite ends attached to the tension lever 720 between the guide pin 721 thereof and a pivot 725 for the lever 720, the band ends being positioned closer to the pivot 725. The tension lever 720 has an end portion bent downward to provide a contact piece 724 extending through the chassis 100. The contact piece 724 is positioned close to one end of a control lever 330 pivoted to the rear side of the chassis 100. The tension lever 720 is biased counterclockwise by a spring 723 and restrained from moving pivotally by the leading guide block 804. The other end of the spring 723 is engaged with a spring retainer 333 projecting from a free end portion of the control lever 330 upward beyond the chassis 100.

Provided on the rear side of the chassis 100 opposite to the loaded position of the cassette 600 is a control slide 430 in the form of a circular arc and rotatable about a point P along the chassis 100. The control slide 430 is positioned with its curving-in side facing toward the front and extends under a portion of the rotary cylinder 800 and along the capstan motor 500. The central point of rotation, P, is located closer to the take-up reel support 200b, as positioned between the two reel supports 200a, 200b. The brake lever 521 and the control lever 330 are interposed between the chassis 100 and the control slide 430. Also provided between the control slide 430 and the chassis 100 are drive gears 320a, 320b, each connected to the leading guide block 804 by a link mechanism 428.

Disposed inside the curving-in portion of the slide 430 is an idler unit 730 mounted on the chassis 100 for transmitting a torque to the reel supports 200a, 200b. The idler unit 730 is provided between an intermediate gear 221 meshing with the reel support 200a and an intermediate gear 222 meshing with the reel support 200b, and a swing idler 700 is pivotally movable into engagement with one of the gears 221, 222 selectively. The idler unit 730 has a lower end extending through the chassis 100. A belt 501 is reeved around a pulley 702 on the lower end and the capstan motor 500.

Brake levers 241a, 241b are pivotably provided between the reel supports 200a, 200b for giving a braking load to the respective supports 200a, 200b. The brake lever 241b to be in contact with the take-up reel support 200b has a pin 244 extending from an end portion thereof loosely through the chassis 100 to project downward. A tension spring 255 is connected between the two brake levers 241a, 241b. Each of these brake levers has a pad 256 affixed thereto for contact with the side face of the reel support. Disposed in front of the brake lever 241b is an actuator 258 which is slidable forward and rearward to bear on the brake lever 241b in STOP mode and push the lever 241b.

A motor 515 is provided on the rear side of the chassis 100 in the rear of the idler unit 730 and has a worm 516 on the motor shaft. As shown in FIGS. 18A and 18B, an operation lever 713 is fitted to a pivot 712 on the chassis 100 at a position between the worm 516 and the curving-in portion of the control slide 430.

The operation lever 713, which is positioned below the control slide 430, has a projection 713a projecting upward from one end thereof and fitting in a cam groove 430c of the control slide 430, and a projection 714 projecting upward from the other end thereof. Between the pivot 712 and the projection 714, the operation lever 713 is formed with an elliptical aperture 718, in which a boss 143 projecting downward from the chassis 100 loosely fits.

A pivotal arm 715 fitted to the same pivot as the operation lever 713 is placed on the lever 713. The pivotal arm 715 is biased clockwise by a tension spring 716 into pressing contact with a stopper 171 provided on the chassis 100, and has an operating end 715a provided by a free end thereof and positioned close to the pin 244 of the brake lever 241b. The brake lever 241a has a pin 244 projecting downward therefrom through the chassis 100 and engaged with a release mechanism on the rear side of the chassis 100, and is away from the reel support 200a. However, this arrangement will not be described further.

The worm 516 is in mesh with an intermediate gear 742, which in turn meshes with an intermediate gear 743. The gear 743 is in mesh with a drive cam gear 740 opposed to the lower surface of the control slide 430 in the path of movement of the slide 430. The drive cam gear 740 is rotatably mounted on a shaft 744 on the chassis 100 and has a pinion 746 provided on the upper side thereof and smaller than the toothed outer periphery 740a thereof. The pinion 746 meshes with a rotary sensor switch 910 for detecting a travel mode.

The sensor switch 910 feeds a signal to a control circuit (not shown), which controls the rotation of the motor 515 based on the detection signal. The sensor switch 910 meshes with a gear 751 formed with a cam groove 752 and extending through the chassis 100. The gear 751 is in mesh with a lower end portion of a screw sleeve 750 rotatably fitted around a pivot 451. A pinch lever 450 is fitted to the upper end of the screw sleeve 750 coaxially with the pivot 451.

The pinch lever 450 carries at its outer end a pinch roller 503, which is positioned above the cassette in EJECT mode. An auxiliary lever 452 is supported by the pivot 451. A tension spring 453 is connected between the auxiliary lever 452 and the pinch lever 450. A wall 459 over the gear 751 is formed in a left portion thereof with a guide groove 459a. A projection 455 projecting downward from one end of the auxiliary lever 452 is fitted in the upper portion of the guide groove 459a.

When EJECT mode is changed over to PLAY mode, the gear 751 and the screw sleeve 750 rotate, causing the pinch lever 450 and the auxiliary lever 452 to descend along the guide groove 459a. Upon completion of descent, the projection 455 fits into the cam groove 752 of the gear 751, and the pinch lever 450 and the auxiliary lever 452 rotate clockwise along the cam groove 752. The auxiliary lever 452 continues to rotate with the pinch roller 503 in contact with the capstan shaft 502, tensioning the tension spring 453 to press the pinch roller 503 against the capstan shaft 502. This arrangement is already known as disclosed in Examined Japanese Patent Publication SHO 62-154255 and therefore will not be described in detail.

Figure 5:
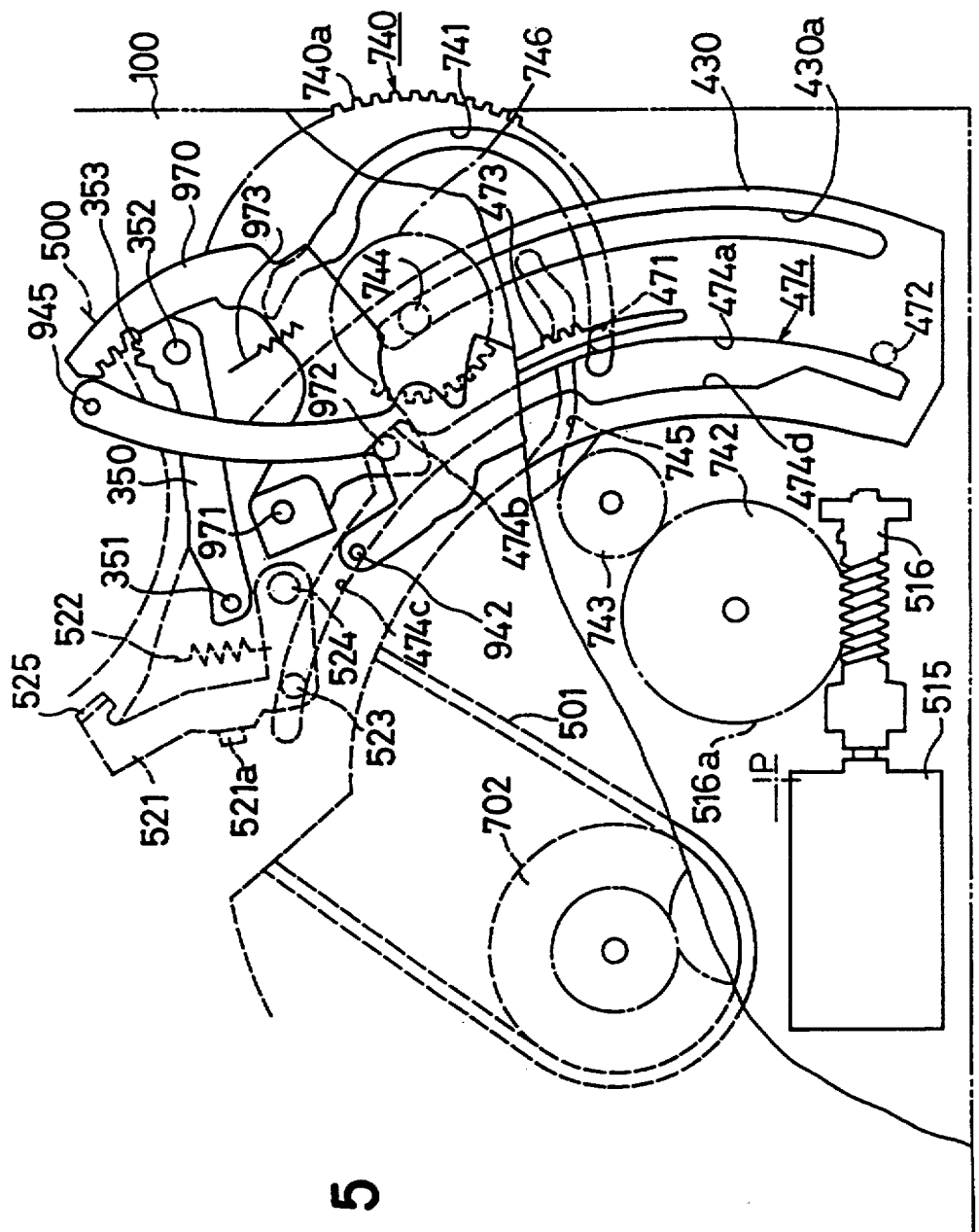
FIG. 5 is an enlarged fragmentary plan view of the apparatus with the chassis partly broken away.

Driving Control Slide (see FIGS. 5, 6 and 7)

The control slide 430 has a first projection 471 and a second projection 472 projecting from the underside of a rightward portion thereof. The first projection 471 is positioned closer to the central portion of the slide 430 than the second projection 472. A toothed projection 473 in the form of a rack and meshable with the pinion 746 of the drive cam gear 740 is provided on the underside of the control slide 430 in the vicinity of the first projection 471. The tooth ends of the projection 473 are directed outward.

Figure 6A:
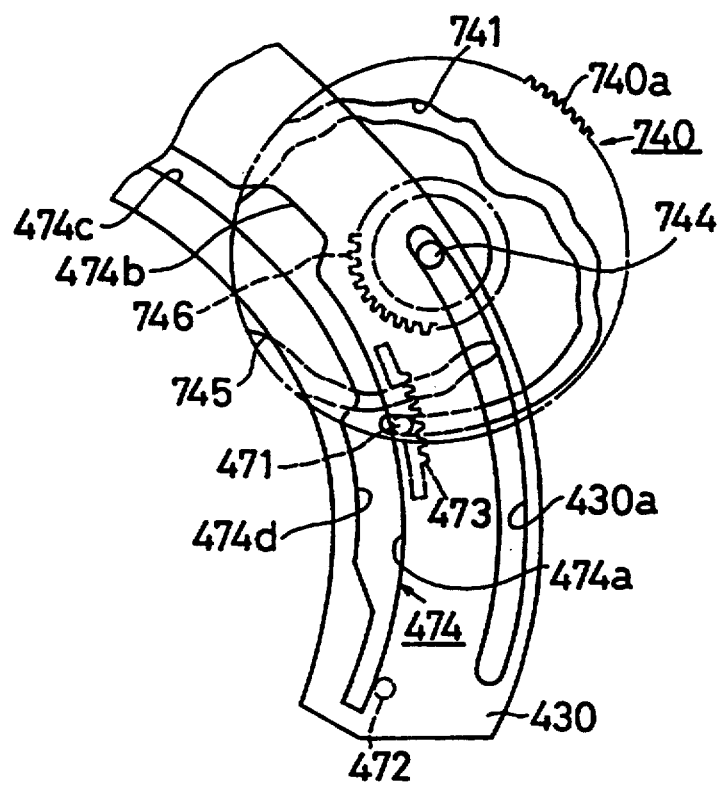
FIG. 6A is a view showing the relationship between a drive cam gear and a control slide in EJECT mode.

Formed in the upper surface of the drive cam gear 740 are a cam groove 741 for the first projection 471 of the slide 430 to fit in, and a cam groove 745 for the second projection 472 to fit in. The latter cam groove 745 extends from an opening at an outer peripheral portion of the gear 740 toward the shaft 744, while the former cam groove 741 extends from an opening at an outer peripheral portion toward the shaft 744 and then extends to and terminates at an outer peripheral portion. As seen in FIG. 6A, the control slide 430 is formed with a circular-arc slot 430a centered about the point P and having the shaft 744 fitted therein. The first projection 471 is fitted in the terminal end of the cam groove 741 in EJECT mode.

Figure 6B:
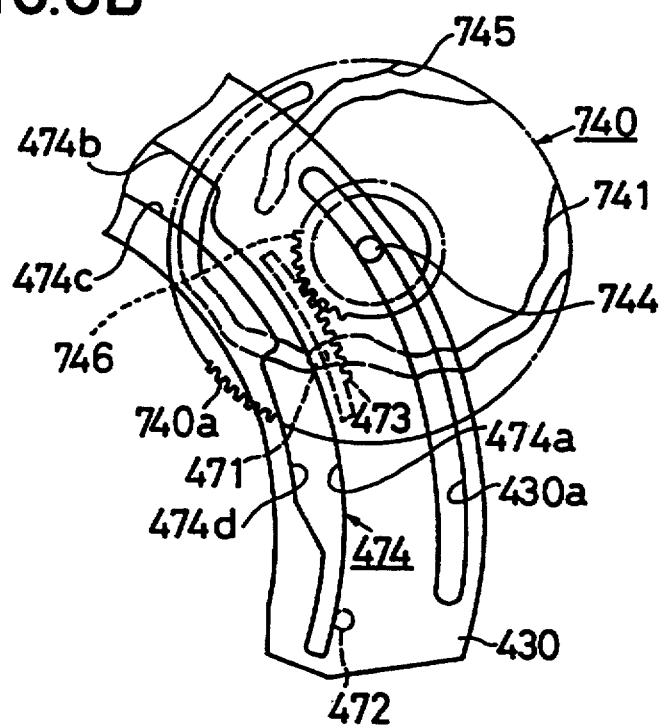
FIG. 6B is a view showing a pinion of the drive cam gear in mesh with a toothed projection of the control slide.

When the magnetic tape 601 is to be loaded, the drive cam gear 740 rotates clockwise with the motor 515. The first projection 471 slides along the cam groove 741, whereby the control slide 430 is slidingly moved counterclockwise. With the slide 430 thus moved by virtue of the cam groove 741, the sliding speed of the control slide 430 is variable according to the mode of travel of the tape. A specified amount of sliding movement of the control side 430 meshes the toothed projection 473 of the slide 430 with the pinion 746 of the drive cam gear 740, whereby the slide 430 is further rotated counterclockwise as seen in FIG. 6B.

Figure 7A:
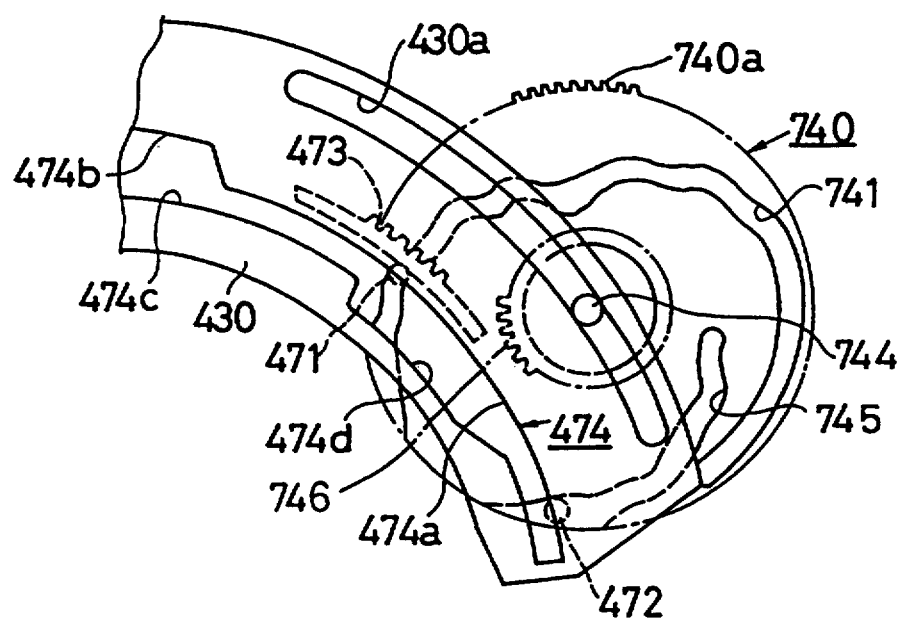
FIGS. 7A and 7B are views showing the pinion out of mesh with the toothed projection.
Figure 7B:
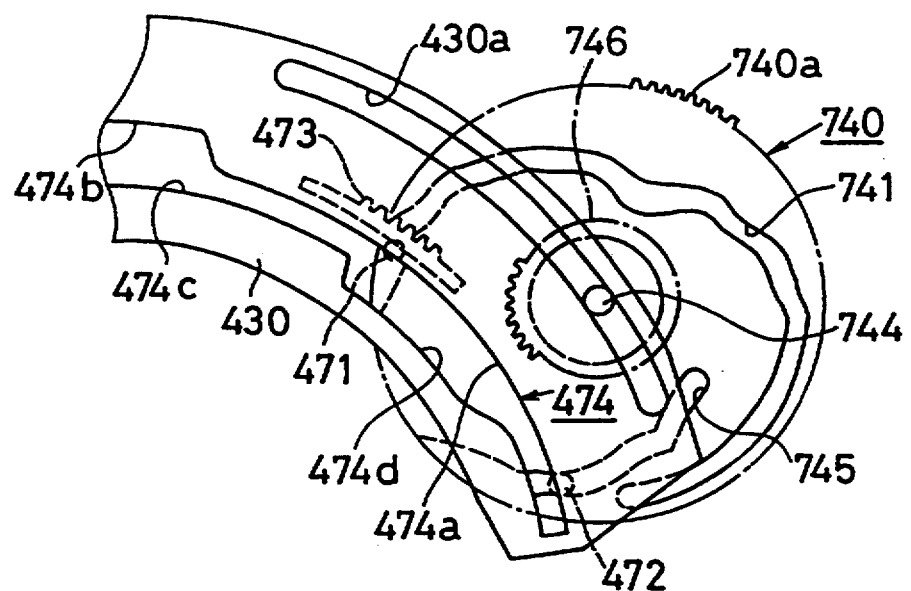

When the first projection 471 is brought to a position close to the opening of the cam groove 741, the second projection 472 is positioned at the outer peripheral opening of the cam groove 745 as shown in FIG. 7A. With a further clockwise rotation of the drive cam gear 740, the second projection 472 slides along the cam groove 745, whereby the slide 430 is further rotated counterclockwise as shown in FIG. 7B. The moving control slide 430 stops upon the second projection 472 coming into contact with the terminal end of the grooved portion 745. In this way, the first and second projections 471, 472 alternately engage in the respective cam grooves 741, 745 to slidingly move the control slide 430.

Driving Guide Parts and Tension Lever (see FIGS. 8 to 18B)

The control slide 430 is formed in its upper side with a cam groove 474 generally in the form of a circular arc extending approximately from its central portion rightward as centered about the point P. The cam groove 474 has an outer recess 474b positioned slightly leftward from the midportion of its length and giving the groove an increased width in a direction away from P, and an inner recess 474d positioned rightward in the lengthwise direction thereof and giving the groove an increased width in a direction toward P. Also formed in the upper side of the control slide 430 is a cam groove 431 extending approximately from its central portion leftward. A projection 330a projecting downward from the control lever 330 is fitted in the cam groove 431.

Figure 8:
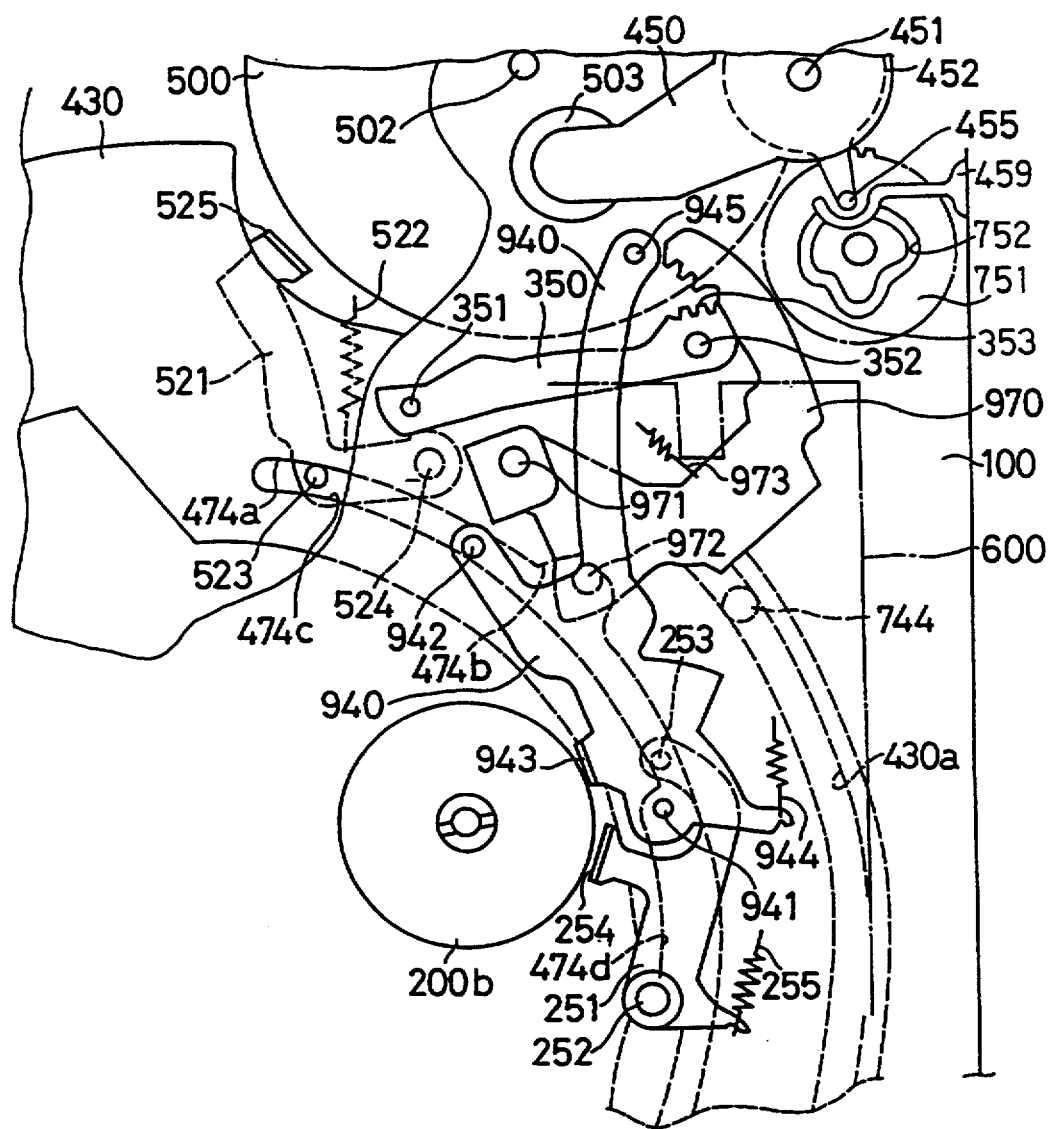
FIG. 8 is a fragmentary plan view of the recording-reproduction apparatus in EJECT mode.
Figure 14:
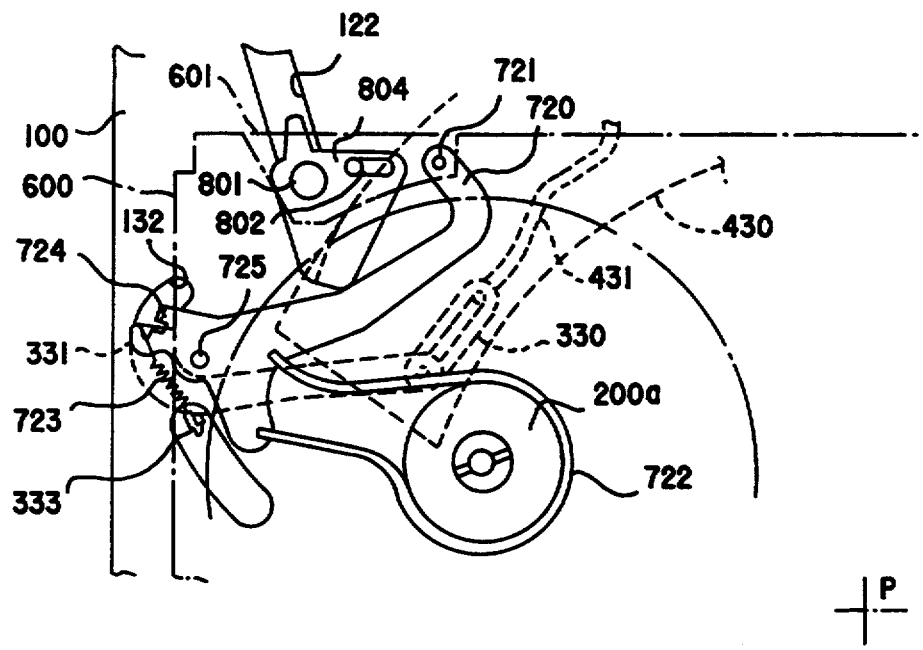
FIG. 14 is a fragmentary plan view showing the position of a tension lever in EJECT mode.

With reference to FIG. 8, the pin 523 on the brake lever 521 is in contact with an outer side wall 474a defining the cam groove 474 in EJECT mode, holding the brake lever 521 away from the capstan motor 500. The pin 972 on the operation lever 970 is in contact with the outer recessed portion 474b of the cam groove 474. The free end of the operation lever 970 is in contact with the toothed portion 353 of the withdrawing lever 350 standing by inside the loaded position of the cassette 600. The pin 942 on the tension regulator lever 940 and the pin 253 on the soft brake lever 251 are in contact with an inner side wall 474c defining the cam groove 474. The pad 943 of the regulator lever 940 is away from the take-up reel support 200b. A pad 254 of the soft brake lever 251 is away from the side face of the reel support 200b. As seen in FIG. 14, the control lever 330 is fitted to the terminal end of the cam groove 431.

As previously stated, the control slide 430, with the first projection 471 fitting in the terminal end of the cam groove 741 in EJECT mode, is moved by the rotation of the drive cam gear 740 to a position wherein the second projection 472 is in contact with the terminal end of the cam grooved portion 745. In this position, the present embodiment is in FF/REW mode. Four modes of travel of the tape are provided from EJECT mode to FF/REW mode. These four modes are in the order of INITIAL mode, REV mode, SLOW mode and PLAY mode. INITIAL mode is a state in which the magnetic tape 601 in EJECT mode is positioned as withdrawn by the withdrawing guide 351. SLOW mode is the state of low-speed reproduction. Between INITIAL mode and REV mode, each leading guide block 804 slides along a guide groove 122. The guide parts in PLAY mode are in the same arrangement as in STOP mode.

Each of the above modes is detected with reference to the amount of rotation of the sensor switch 910 which rotates with the drive cam gear 740. The capstan motor 500 is controlled for starting and stopping in accordance with the detection signal from the sensor switch 910. In the above modes, the guide parts, which are operable under the control of the control slide 430, operate as shown in FIGS. 8 to 13. FIG. 32 shows the operation timing of the guide parts. The state of the guide parts in a tape withdrawing position will be referred to as "on," and the guide part as positioned inside the cassette will be referred to as being "off." The brake will be referred to as being "on" when in contact with the counterpart.

(INITIAL mode)

Figure 9:
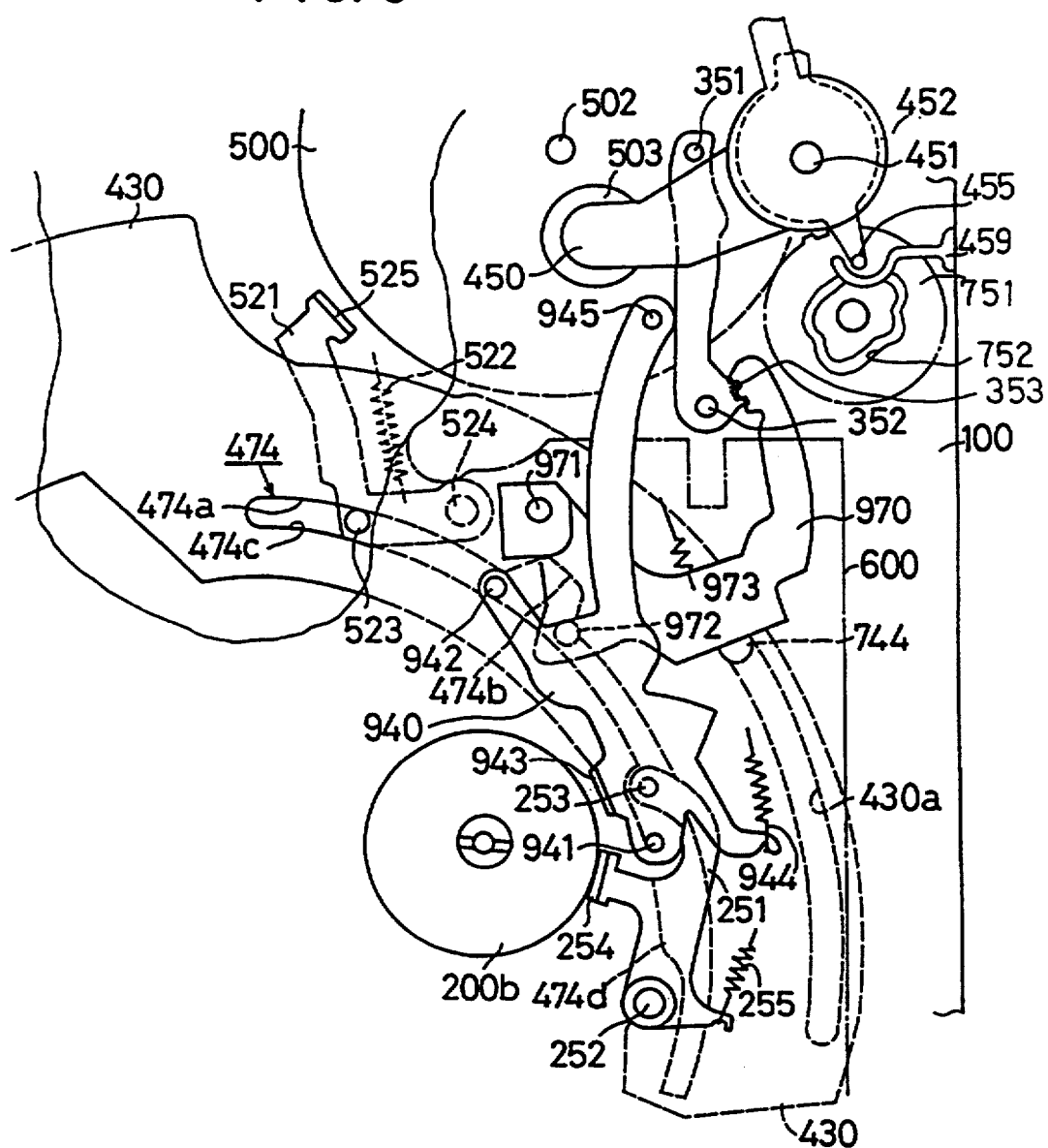
FIG. 9 is a fragmentary plan view of the same in INITIAL mode.

When the control slide 430 in EJECT mode shown in FIG. 8 rotates counterclockwise to the INITIAL mode position, the inner side wall 474c defining the guide groove 474 moves out of contact with the pin 253 of the soft brake lever 251, and the inner recessed part 474d continuous with the inner side wall 474c approaches the pin 253 as shown in FIG. 9. The soft brake lever 251 is biased counterclockwise by the tension spring 255 and is therefore brought into contact with the side face of the take-up reel support 200b, and the pin 253 moves away from the inner recessed portion 474d.

On the other hand, the pin 972 on the operation lever 970 is brought out of the outer recess 474b of the guide groove 474 into contact with the outer side wall 474a, whereby the lever 970 is rotated clockwise. This causes the free end of the lever 970 to move the withdrawing lever 350 clockwise about the pivot 352. Accordingly, the withdrawing guide 351 withdraws the magnetic tape 601 from the cassette 600 in the INITIAL mode immediately before the tape is loaded by the leading guide block 804. At this time, the pinch roller 503 is positioned between the tape withdrawn by the guide 351 and the cassette 600 and above the cassette 600. The brake levers 241a, 241b remain in the same position as in EJECT mode.

(REV mode)

Figure 10:
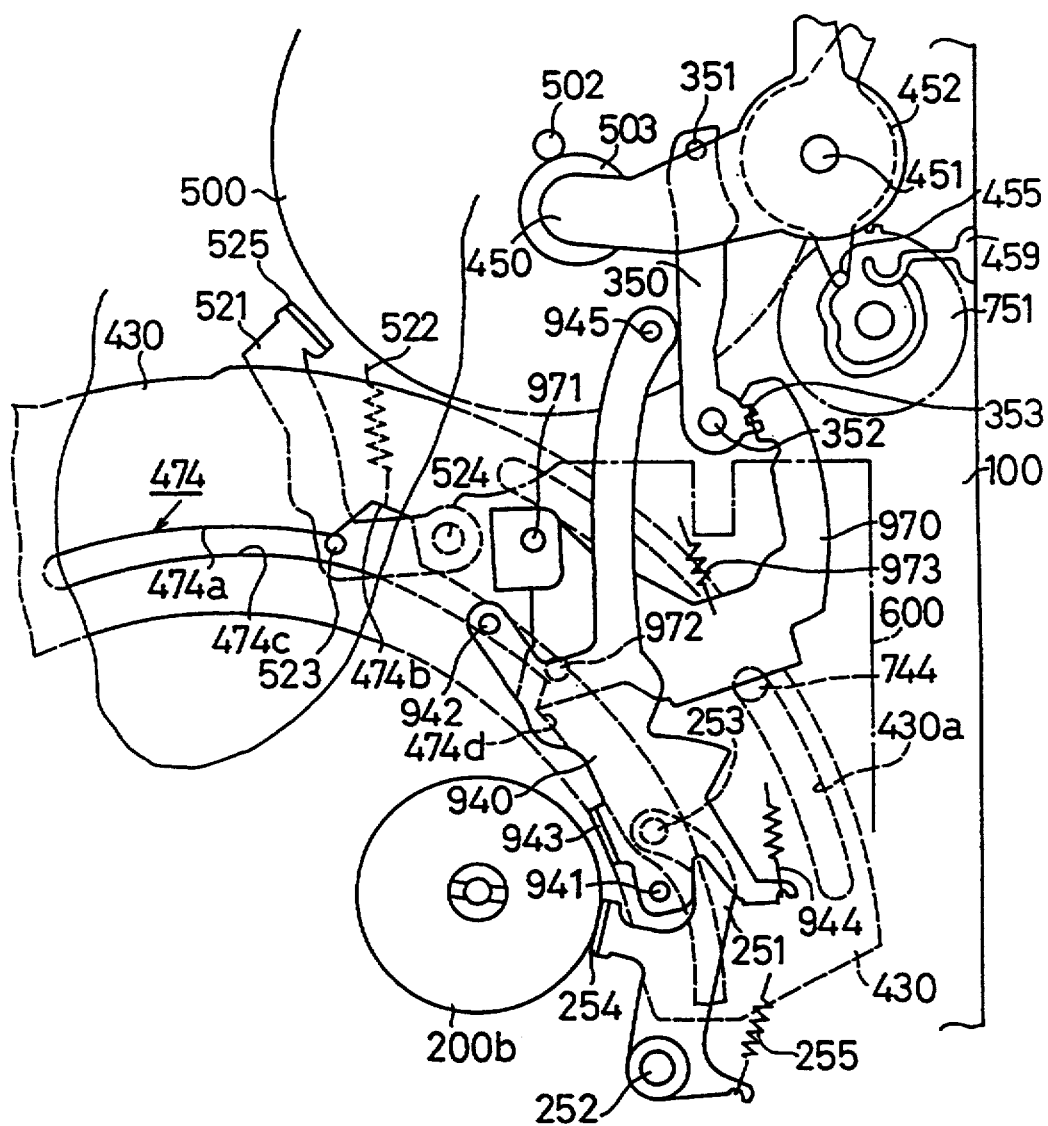
FIG. 10 is a fragmentary plan view of the same in REV mode.

The control slide 430 further rotates counterclockwise to a REV mode position. In this state, the soft brake lever 251, withdrawing guide 351, brake lever 521 and tension regulator lever 910 remain in the same position as in INITIAL mode as seen in FIG. 10. As will be described later, however, the leading guide blocks 804 are slidingly moved forward by the control slide 430, withdrawing the magnetic tape 601 and winding the tape around the rotary cylinder 800, and are thereafter pressed against the catchers 806 and retained in this state until FF/REW mode is reached. The pinch lever 450 and the auxiliary lever 452 are moved down by the rotation of the screw sleeve 750 for the projection 455 of the lever 452 to fit into the gear 751. The rotation of the gear 751 pushes the projection 455 clockwise to press the pinch roller 503 against the capstan shaft 502. The magnetic tape 601 is transported as held between the capstan shaft 502 and the pinch roller 503 in this state.

Figure 15:
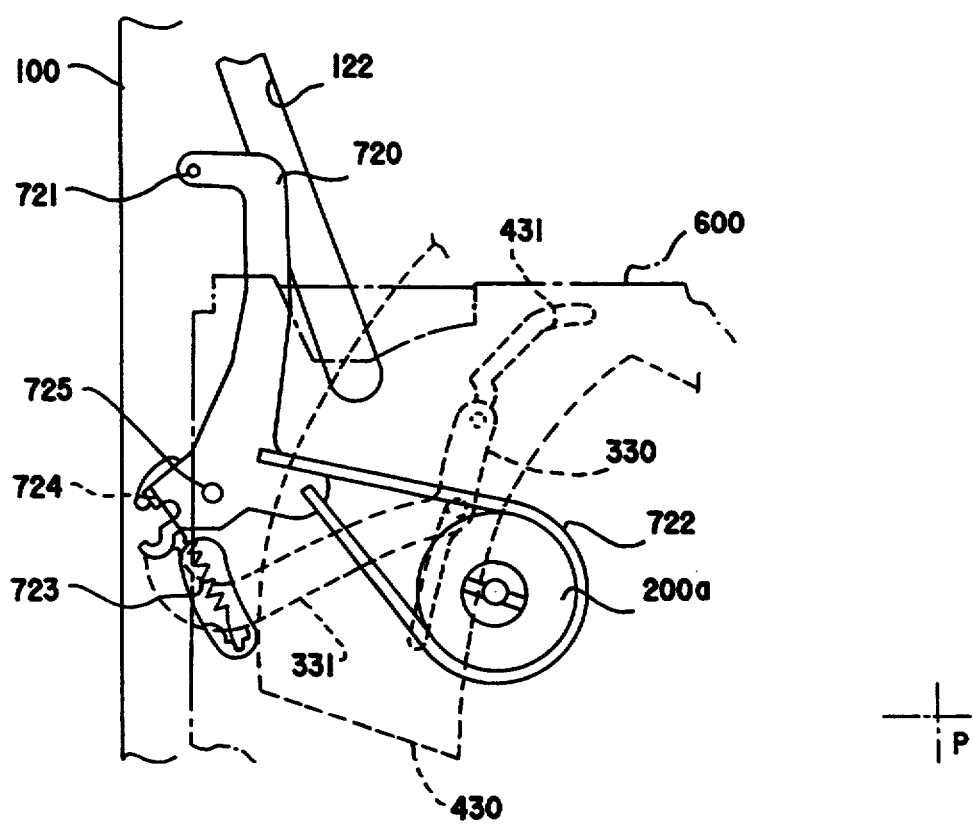
FIG. 15 is a fragmentary plan view showing the same in REV mode.

With reference to FIG. 15, the control lever 330 rotates counterclockwise along the cam groove 431. Since the tension lever 720 has been released from restraint by the leading guide block 804, the lever 720 is rotated counterclockwise by the spring 723 until the contact piece 724 comes into contact with the control lever 330. The guide pin 721 reaches a position close to the magnetic tape 601, pulling the band 722, but the spring 723 stretches only slightly without tensioning the band 722. The release mechanism disengages from the brake lever 241a, and the actuator 258 comes into contact with the brake lever 241b, moving the lever 241b away from the reel support 200b. The mechanism for slidingly moving the actuator 258 will not be described.

(SLOW mode)

Figure 11:
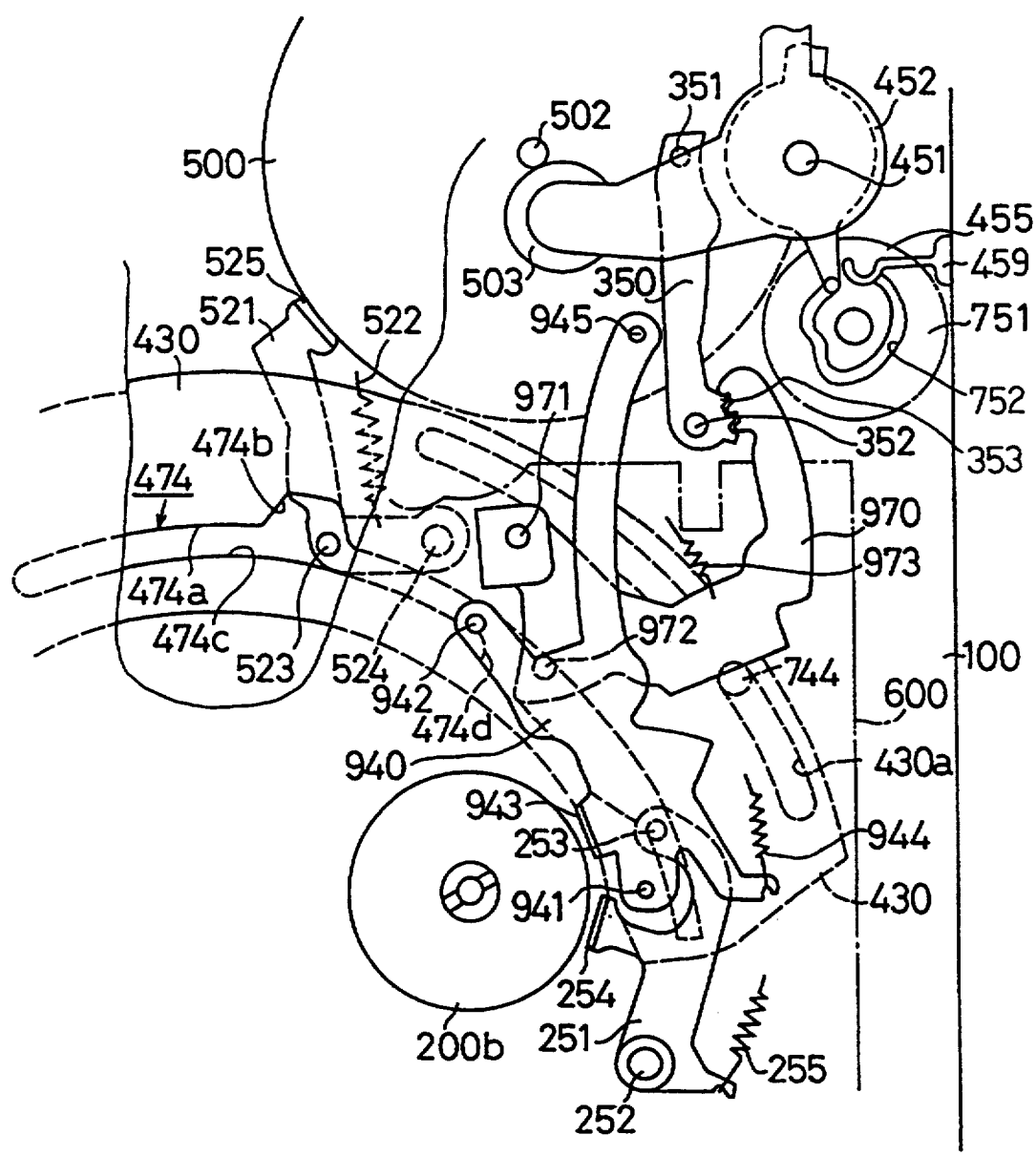
FIG. 11 is a fragmentary plan view of the same in SLOW mode.

When the control slide 430 further rotates counterclockwise to a SLOW mode position, the outer recess 474b of the guide groove 474 is brought close to the pin 523 of the brake lever 521 as shown in FIG. 11. Since the brake lever 521 is biased clockwise about a pivot 524 by the spring 522, a pad 525 on the brake lever 521 comes into contact with the side face of the capstan motor 500 upon the pin 523 being brought out of contact with the guide grooved portion 474, to give the motor 500 a light load against the direction of rotation.

The capstan motor 500 is intermittently driven to repeat rotation and stopping in SLOW mode, so that the motor 500 is lightly loaded and thereby prevented from being influenced by the reaction of the belt 501. Further the pin 253 on the soft brake lever 251 contacts the inner side wall 474c defining the groove 474 again, moving the lever 251 away from the take-up reel support 200b against the tension spring 255. Accordingly, the take-up reel smoothly winds up the magnetic tape 601 thereon. The withdrawing guide 351 and the tension regulator lever 940 are in the same position as in INITIAL mode.

Figure 16:
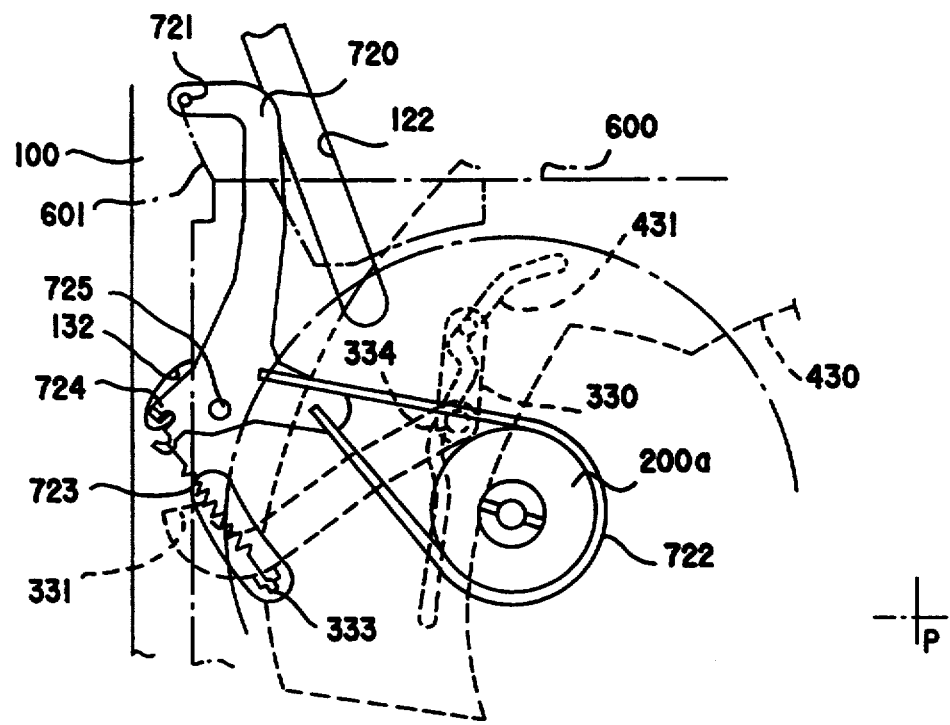
FIG. 16 is a fragmentary plan view showing the same in PLAY mode.

With reference to FIG. 16, the control lever 330 further rotates counterclockwise, stretching the spring 723. The tension lever 720 rotates counterclockwise to bring the guide pin 721 into contact with the magnetic tape 601. The band 722 is tensioned to give a rotational load to the supply reel support 200a.

(PLAY mode)

Figure 12:
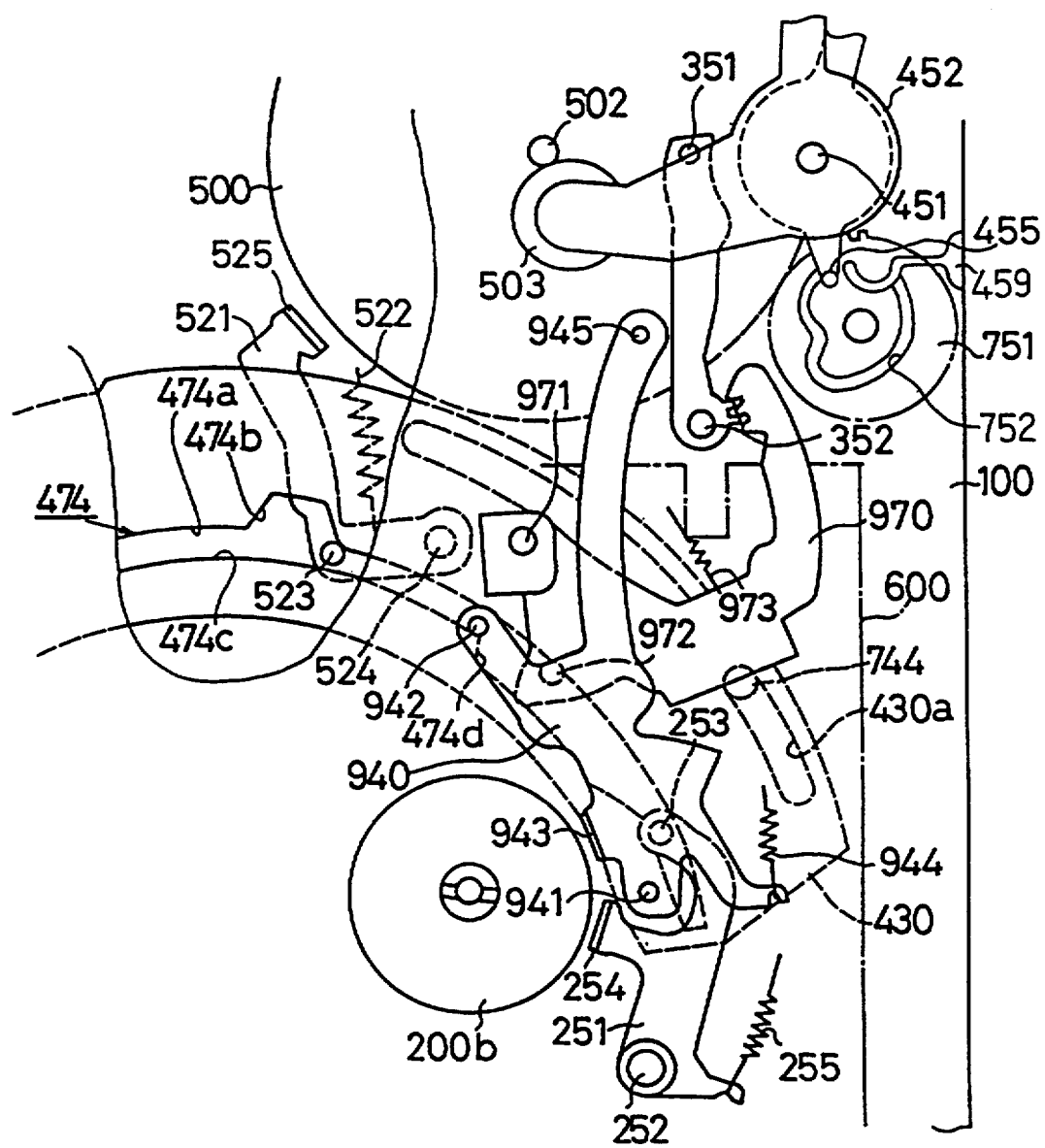
FIG. 12 is a fragmentary plan view of the same in PLAY mode.

When the control slide 430 further rotates counterclockwise to a PLAY mode position, the pin 523 on the brake lever 521 comes into contact with the outer side wall 474a defining the guide groove 474, moving the brake lever 521 away from the capstan motor 500 against the tension spring 522 as shown in FIG. 12. In this state, the capstan motor 500 is relieved of the light load applied thereto and rotates smoothly. The tension lever 720 is in the same position as in SLOW mode.

(FF/REW mode)

Figure 13:
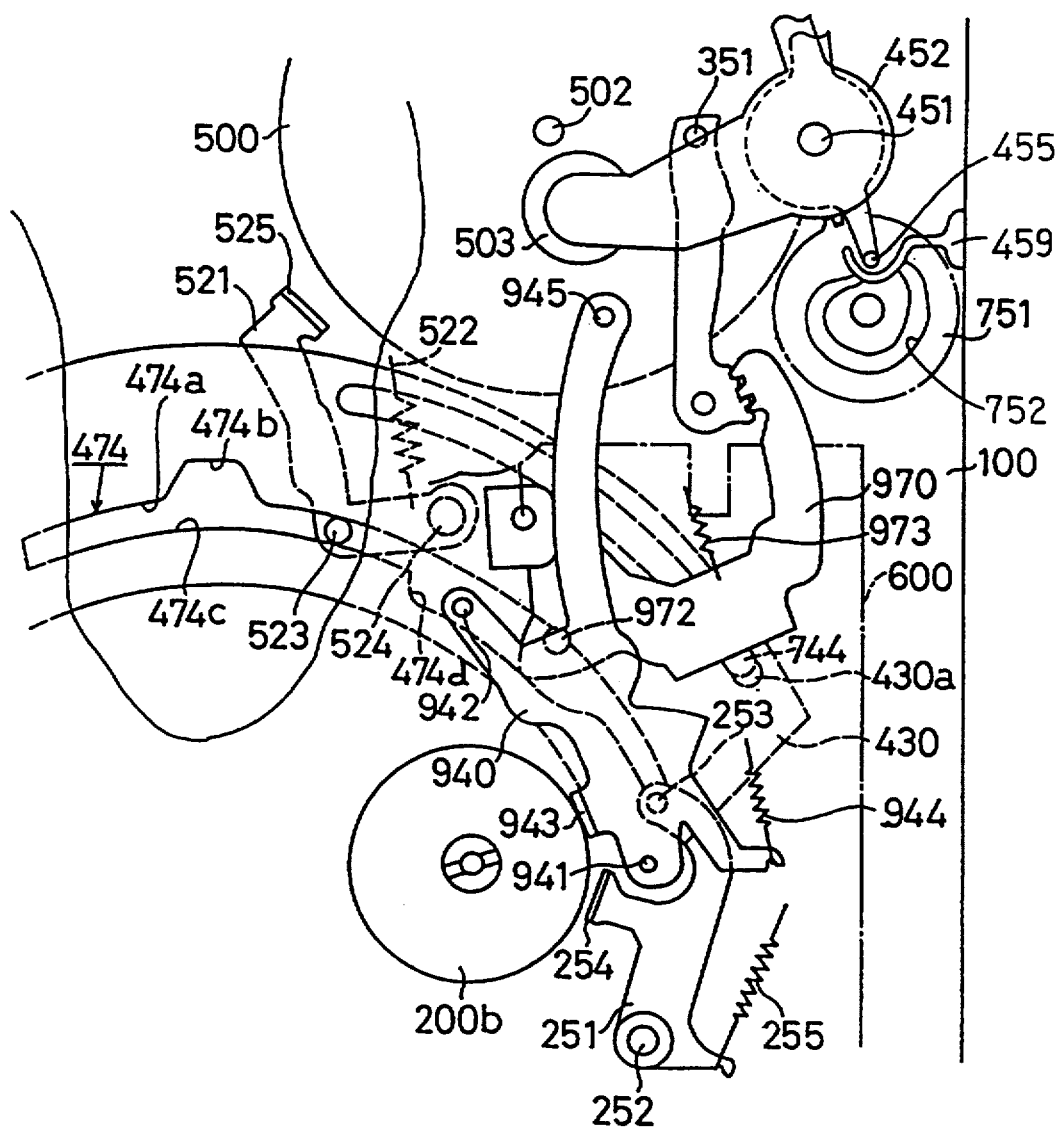
FIG. 13 is a fragmentary plan view of the same in FF/REW mode

When the control slide 430 further rotates counterclockwise to an FF/REW mode position, the pin 942 on the tension regulator lever 940 is released from the inner side wall 474c, and the inner recess 474d which was positioned close to the pin 253 on the soft brake lever 251 in REV mode approaches the pin 942 as shown in FIG. 13. The regulator lever 940 is rotated counterclockwise by the tension spring 944 to bear on the magnetic tape 601, and the pad 943 is brought into contact with the side face of the take-up reel support 200b.

In the case where the tension of magnetic tape to be wound on the supply reel of the cassette 600 is low, the pad 948 is held in contact with the side face of the take-up reel support 200b to give a specified load to the support 200b. When the tension on the tape is high, the regulator pin 945 bearing on the tape is pushed by the tape, whereby the regulator lever 940 is rotated clockwise against the tension spring 944. The pad 943 is moved away from the reel support 200b, relieving the support 200b of the light load applied thereto and reducing the tension on the tape 601. As a result, the tension on the tape 601 is maintained generally at a constant level. The soft brake lever 251, withdrawing guide 351 and brake lever 521 are in the same position as in PLAY mode.

Figure 17:
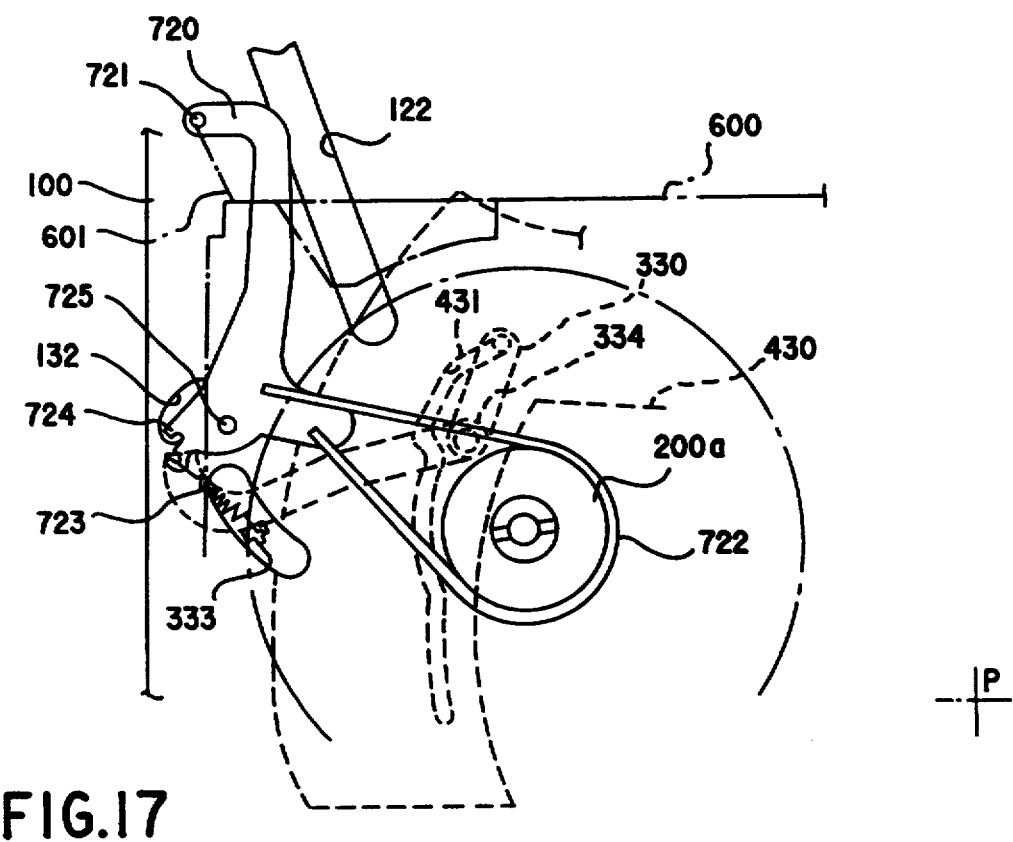
FIG. 17 is a fragmentary plan view showing the same in FF/REW mode.

With reference to FIG. 17, the control lever 330 rotates clockwise from the PLAY mode position along the cam groove 431, causing its outer end to approach the contact piece 724 to compress the spring 723 and slacken the band 722. With the band 722 less tensioned, the take-up reel support 200b is made rotatable smoothly, and the tension on the tape 601 is reduced, permitting the tape 601 to travel with good stability.

Thus, the loading length of the spring 723 is made shorter in FF/REW mode than in PLAY mode to lower the load, permitting the reel to wind up the magnetic tape 601 with the tension thereon controlled to a relatively low level.

Further the actuator 258 is moved away from the brake lever 241b, which is held away from the reel support 200b by the pivotal lever 715 as will be described below.

Instantaneous Brake Operation (see FIGS. 18A to 23)

When FF/REW mode is to be changed over to STOP mode, the brake levers 241a, 241b are instantaneously brought into contact with the respective reel supports 200a, 200b to stop the rotation of the supports 200a, 200b as in the prior art. For a change-over from FF/REW mode to STOP mode in the present apparatus, the brake lever 241b is instantaneously contacted with the reel support 200b. In STOP mode, the actuator 258 is brought into contact with the brake lever 241b to move the lever away from the reel support 200b. The brake lever 241b is operated by the following mechanism.

A latch lever 531 supported by a pivot on a free end of the pivotal lever 715 is biased counterclockwise about the pivot by a tension spring 532 and pressed into contact with a stopper 717 on the pivotal lever 715. The latch lever 531 has at its forward end a hook 533 which is positioned at the right of the projection 714. The latch lever 531 is provided between its pivot and hook 533 with an L-shaped projecting piece 534, which has an outer end positioned between the forward end of the worm 516 and the chassis 100.

At the left of the pivotal lever 715, a change-over lever 738 is fitted to a pivot 737. The lever 738 has an end portion engageable with the idler gear unit 730 in FF/REW mode to transmit the rotational torque of the capstan motor 500 directly to the reel supports 200a, 200b, but this arrangement will not be further described.

The operation lever 713 is biased clockwise about the pivot 712 by a tension spring 739 extending between the change-over lever 738 and the lever 713, and is restrained from moving in the clockwise direction by pressing contact of one end of the elliptical apertured portion 718 with the boss 143. The change-over lever 738 is biased by the tension spring 739 clockwise about the pivot 737 and restrained from moving pivotally by the contact of one end thereof with the pivotal lever 715.

A pin 517 extends horizontally from the forward end of the worm 516 and has a fin 518 fitted thereto. As shown in FIG. 22, a torsion spring 519 is provided between the pin 517 and the fin and has one end attached to the fin 518. The torsion spring 519 opens when the pin 517 rotates clockwise. The spring 519 closes and fits intimately to the pin 517 when the pin 517 rotates counterclockwise. Accordingly, the fin 518, pin 517 and torsion spring 519 provide a so-called one-way clutch. In STOP mode, the outer end of the projecting piece 534 is positioned forward beyond the pin 517. The motor 515 and the worm 516, as seen by a viewer opposed to the forward end of the pin 517, rotate clockwise when STOP mode is changed over to FF/REW mode, or counterclockwise when STOP mode is resumed.

(Movements for FF/REW mode)

Figure 20A:
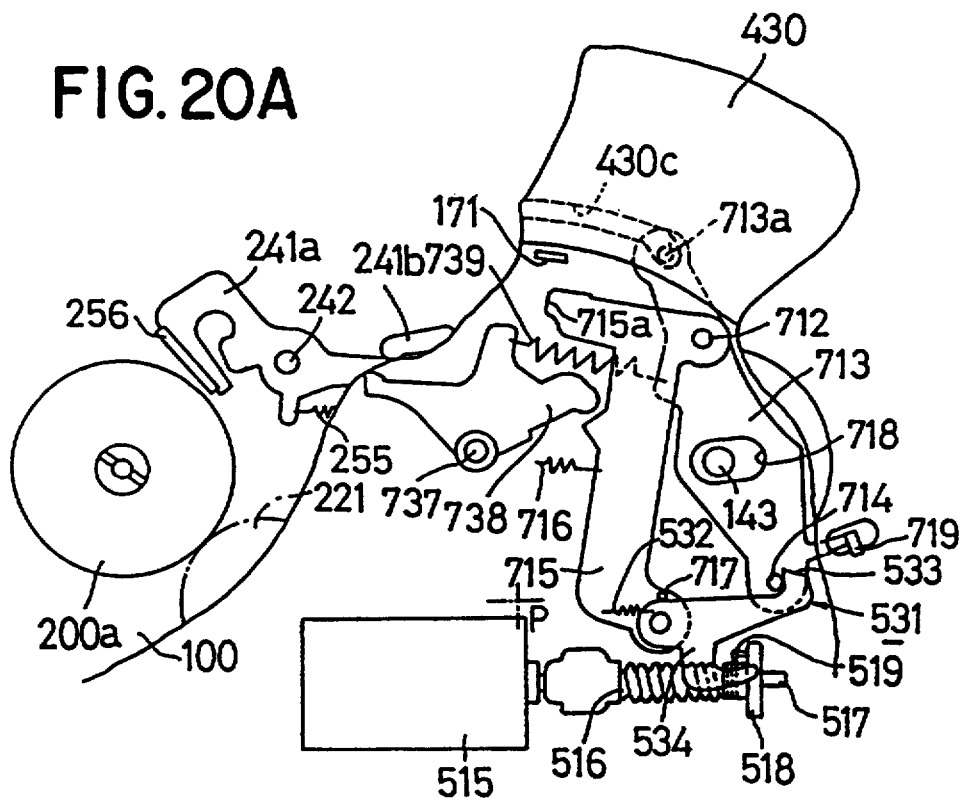
FIGS. 20A and 20B are plan views partly broken away and showing the brake lever in FF/REW mode.
Figure 20B:
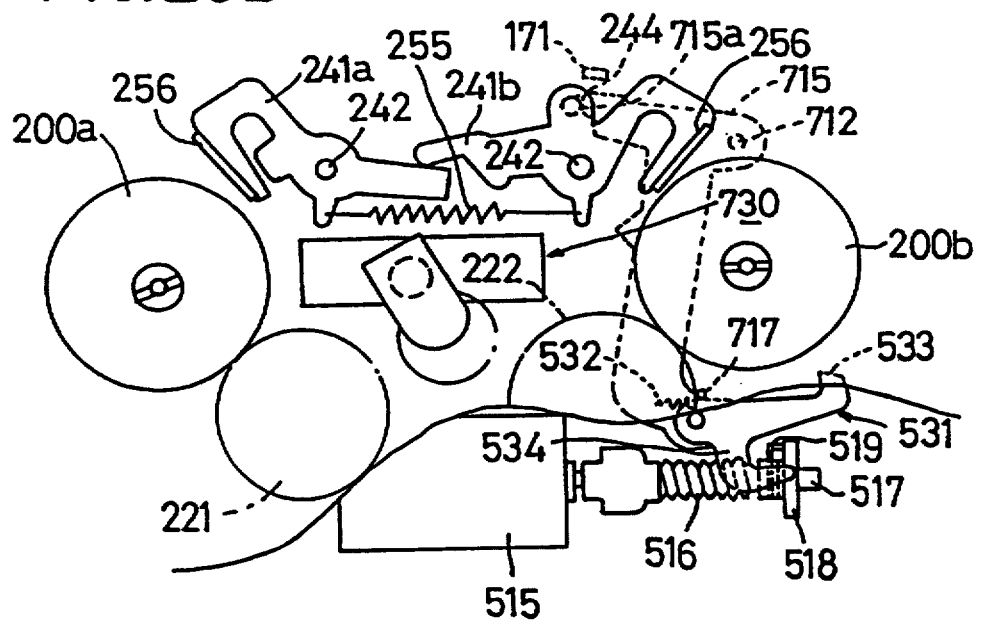

When FF/REW mode is to be set following insertion of the cassette into the apparatus, parts move from the position shown in FIGS. 18A and 18B to the position shown in FIGS. 20A and 20B. The control slide 430 moves counterclockwise about the central point of rotation, P, while the operation lever 713 moves counterclockwise about the pivot 712 along the cam groove 430c of the control slide 430. The end of the elliptical apertured portion 718 moves out of contact with the boss 143, and the projection 714 comes into engagement with the hook 533 of the latch lever 531. The pivotal lever 715 moves counterclockwise about the pivot 712 against the tension spring 716 away from the stopper 171.

The rotation of the pivotal lever 715 brings the outer end of the projecting piece 534 to above the pin 517 as indicated in a broken line in FIG. 22. The fin 518 in rotation strikes against the outer end of the projecting piece 534. Since the worm 516 rotating clockwise opens the torsion spring 519 as previously stated, the fin 518 slips and rotates relative to the pin 517 but is restrained from rotation by contact with the piece 534, with the worm 516 in continued rotation.

With reference to FIG. 20A and 20B, the counterclockwise rotation of the pivotal lever 715 brings the operating end 715a of the lever 715 into contact with the pin 244 on the brake lever 241b, moving the lever 241b counterclockwise about its pivot 242 against the tension spring 255. The brake lever 241b moves away from the take-up reel support 200b into contact with one end of the other brake lever 241a, turning this lever 241a clockwise about its pivot 242 away from the supply reel support 200a. The counterclockwise rotation of the pivotal lever 715 releases the change-over lever 738 from the lever 715, causing the tension spring 739 to move the change-over lever 738 clockwise into engagement with the idler unit 730.

(Operation of Instantaneous Brake)

When FF/REW mode is changed over to STOP mode, the motor 515 and the worm 516 rotate counterclockwise as shown in FIG. 22. Since the torsion spring 519 intimately fits to the pin 517 as previously stated, the fin 518 rotates with the worm 516. The fin 518 kicks the projecting piece 534 rearward by striking contact with the outer end thereof.

Figure 21A:
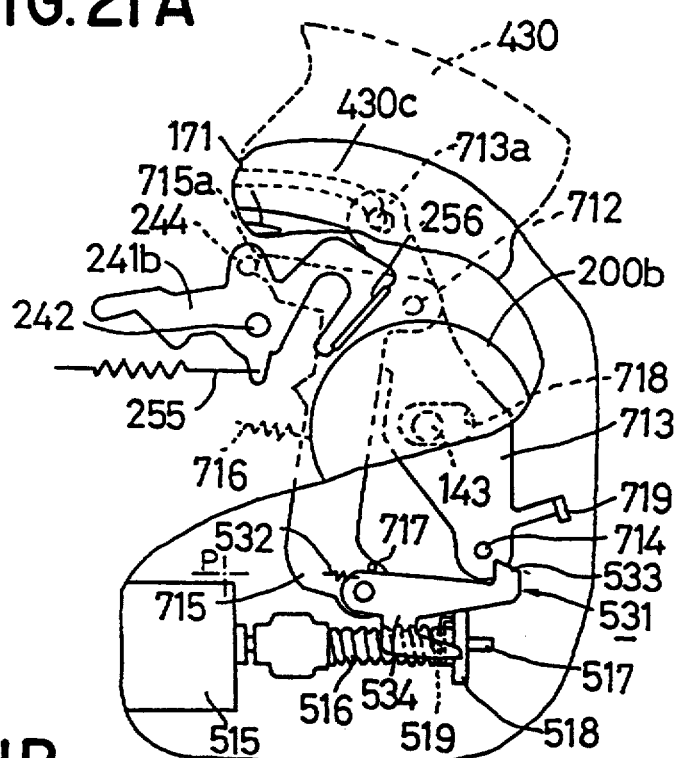
FIGS. 21A and 21B are plan views with the chassis partly broken away to show the movement of a pivotal lever and a latch lever when FF REW mode is changed over to STOP mode.
Figure 21B:
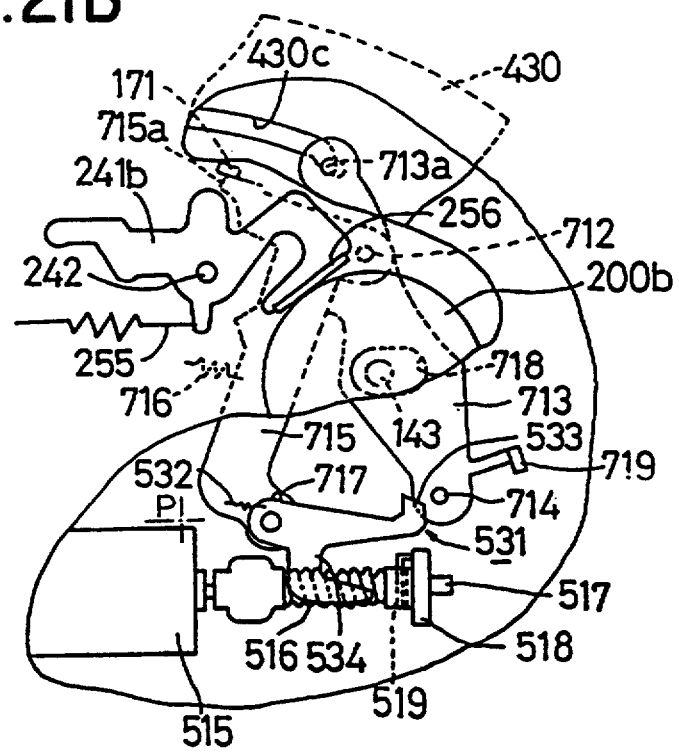

With reference to FIG. 21A, the rearward movement of the projecting piece 534 rotates the latch lever 531 clockwise against the tension spring 532, consequently disengaging the hook 533 from the projection 714 on the operation lever 713. The pivotal lever 715, which is released from the lever 713, is turned clockwise about the pivot 712 by the tension spring 716 into pressing contact with the stopper 171 as shown in FIG. 21B.

The clockwise turn of the pivotal lever 715 disengages the operating end 715a thereof from the pin 244 on the brake lever 241b, permitting the spring 255 to bring the pads 256 of the two brake levers 241a, 241b into contact with the respective reel supports 200a, 200b to instantaneously brake the supports 200a, 200b in rotation.

Figure 19A:
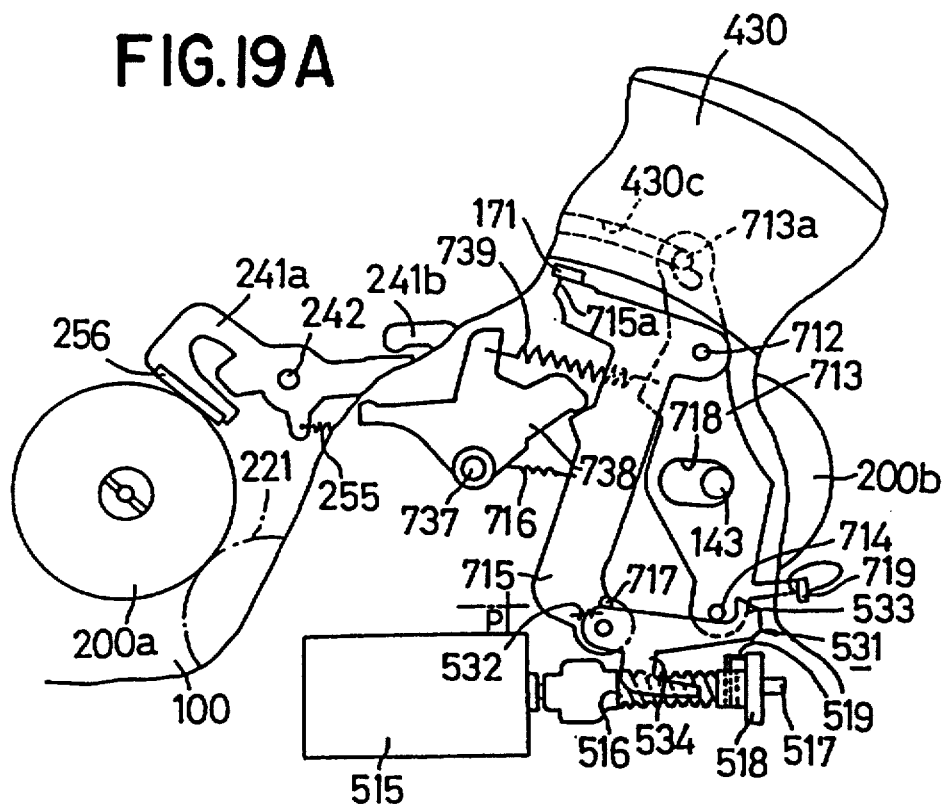
FIGS. 19A and 19B are plan views partly broken away and showing the brake lever in contact with a reel support.
Figure 19B:
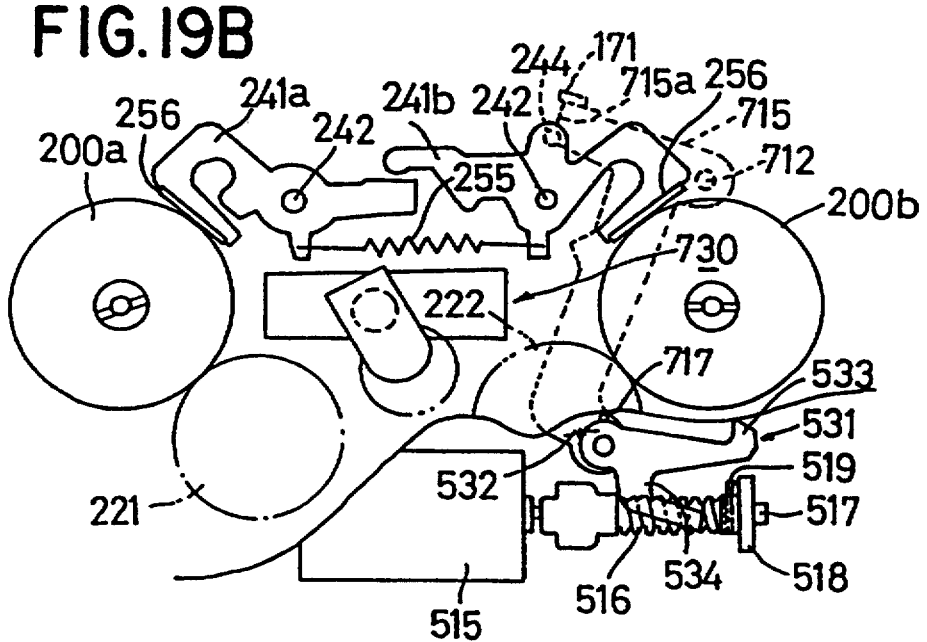

With reference to FIG. 19A, the clockwise turn of the pivotal lever 715 about the pivot 712 makes the lever 715 contact one end of the change-over lever 738, rotating this lever 738 counterclockwise to disengage the lever 738 from the idler unit 730.

When the motor 515 further rotates from the state in which the brake lever 241b is in contact with the reel support 200b toward STOP mode, the control slide 430 rotates clockwise about the central point P, rotating the operation lever 713 clockwise with the projection 713a fitting in the cam groove 430c of the slide 430. As shown in FIG. 23A, the projection 714 on the operation lever 713 comes into contact with the hook 533, and the latch lever 531 rotates clockwise about the pivot against the spring 532 by being pushed by the projection 714 (see FIG. 23B). When the projection 714 comes out of contact with the hook 533 with a further rotation of the operation lever 713, the latch lever 531 is moved counterclockwise by the tension spring 532 into engagement with the projection 714 (see FIG. 23C). In this state, the actuator 258 shown in FIG. 1 slidingly moves rearward in operative relation with the control slide 430, depressing the free end of the brake lever 241b and moving the lever away from the reel support 200b, whereby STOP mode is set.

When FF/REW mode is changed over to STOP mode, the take-up reel support 200b is rotated to wind up the magnetic tape 601 before the pinch roller 503 contacts the capstan shaft 502. This operation will not be described in detail.

Mounting Leading Guide Block (see FIGS. 24 to 28B)

As previously stated, the leading guide block 804 slides along the guide groove 122 between INITIAL mode and REV mode.

The drive gear 320a engaged with the control slide 430 rotates to cause the link mechanism 428 to move the leading guide block 804 for tape loading. The drive gear 320b is also provided with the link mechanism 428 and the leading guide block 804. For a simplified description, the drive gear 320a only will be described.

Figure 24:
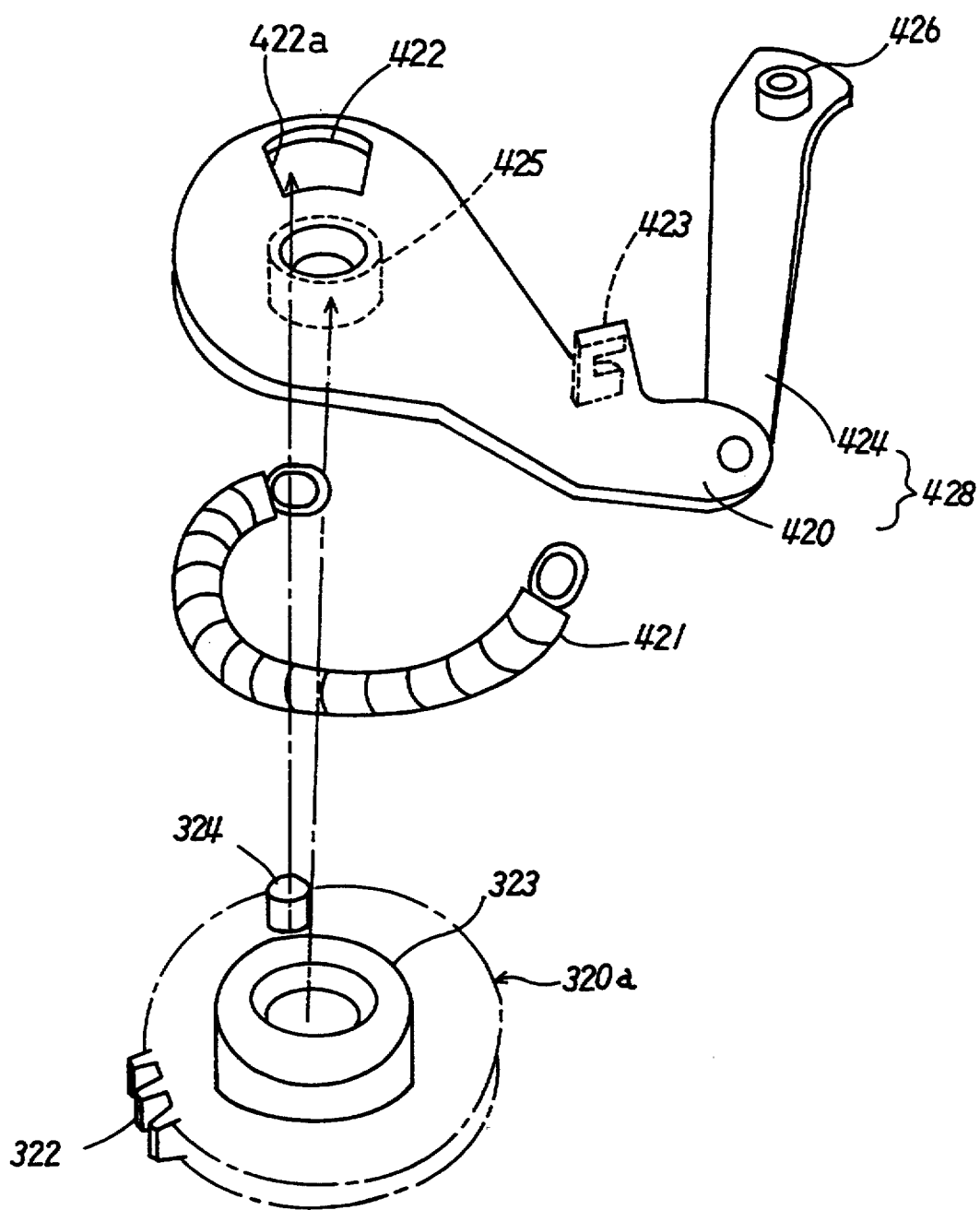
FIG. 24 is an exploded perspective view of a link mechanism and a drive gear.

With reference to FIG. 24, the link mechanism 428 comprises a pivotal plate 420 having a tubular portion 425 projecting therefrom and fitting to a shaft 121, and a link plate 424 fitting to the guide block 804 and supported by a pivot on one end of the pivotal plate 420. A spring retainer 423 is provided on the pivotal plate 420 between the tubular portion 425 and the pivot for the link plate 424. The pivotal plate 424 is formed with a circular-arc slot 422 centered about the axis of the tubular portion 425.

The drive gear 320a fitting to the tubular portion 425 includes a gear portion 322 having a toothed outer periphery, and a boss 323 formed on the upper side of the gear portion 322 and having a smaller cross section than the gear portion 322.

The gear portion 322 has a projection 324 projecting upward from the upper surface thereof and positioned at one side of the boss 323. A tension spring 421 has one end fitted around the projection 324, is wound around the boss 323 and is engaged at the other end thereof with the spring retainer 423 on the pivotal plate 420. The drive gear 320a is fitted to the tubular portion 425 with the projection 324a inserted through the circular-arc slot 422. The projection 324 is pressed against one end 422a of the slotted portion 422 by the restoring force of the spring 421. As is known, the tension spring 421 is provided between the drive gear 320a and the link mechanism 428 to press the guide block 804 against a catcher 806 by the elastic force of the spring 421.

Figure 25:
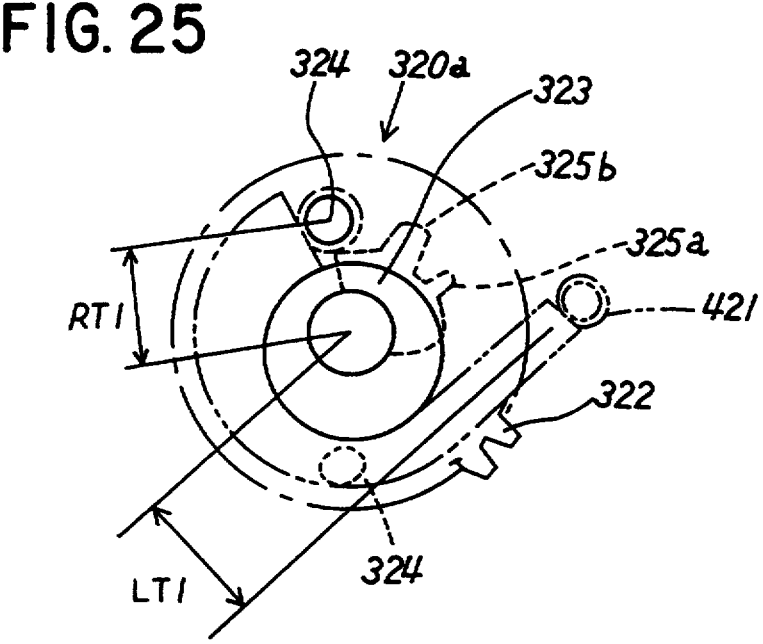
FIG. 25 is a plan view of the drive gear.

With reference to FIG. 25, the gear portion 322 is formed on its underside with a small tooth 325a and a large tooth 325b similar to the small tooth 325a and adjacent thereto in the direction of guide block retracting rotation of the drive gear 320a, these teeth being formed on the same pitch circle. The gear 320a has a pin 324 projecting from its lower surface and positioned on one side of the center thereof opposite to the large tooth 325b.

The boss 323 is eccentric with respect to the center of rotation of the drive gear 320. With the tension spring 421 provided in position, the perpendicular distance LT1 from the center of rotation of the drive gear 320a to the direction of application of the spring load to the spring retainer 423 is greater than the perpendicular distance RT1 from the center of the gear 320a to the direction of application of the spring load to the projection 324.

Figure 26:
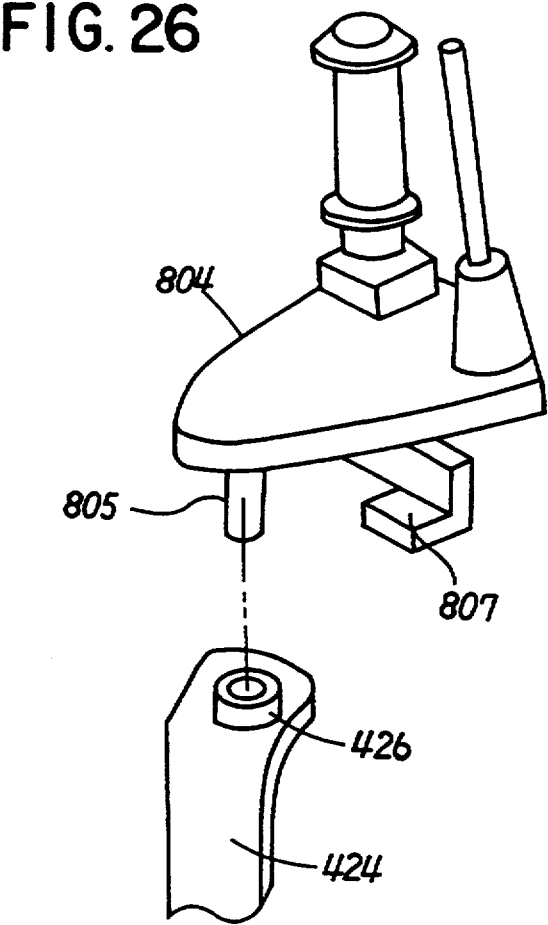
FIG. 26 is an exploded perspective view of a leading guide block and a link plate.

With reference to FIG. 26, a short sleeve 426 projects upward from the forward end of the link plate 424. A pin 805 projecting downward from the rear end of the leading guide block 804 is rotatably fitted in the short sleeve 426. At the left of the pin 805 a support piece 807 extends rearward for supporting thereon the forward end of the link plate 424.

Figure 27:
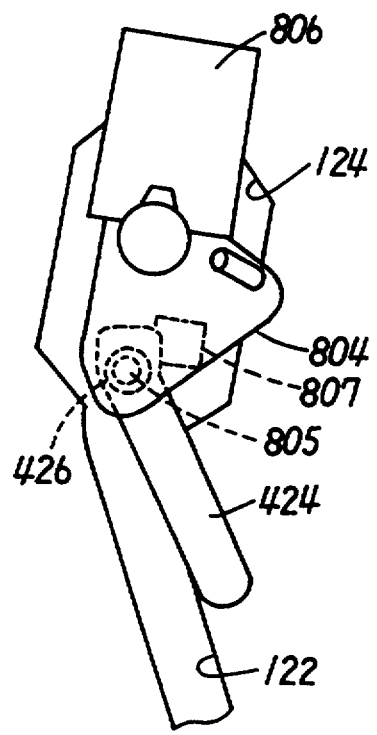
FIG. 27 is a plan view for illustrating the leading guide block as attached to the link mechanism with a catcher mounted on the chassis.

When the guide block 804 is to be connected to the link plate 424 as shown in FIG. 27, the support piece 807 becomes an obstacle to the insertion of the pin 805 of the block 804 into the short sleeve 426 of the link plate 424 if this is attempted with the block 804 in contact with the catcher 806 and with the drive gear 320a fitting to the shaft 121.

Figure 28A:
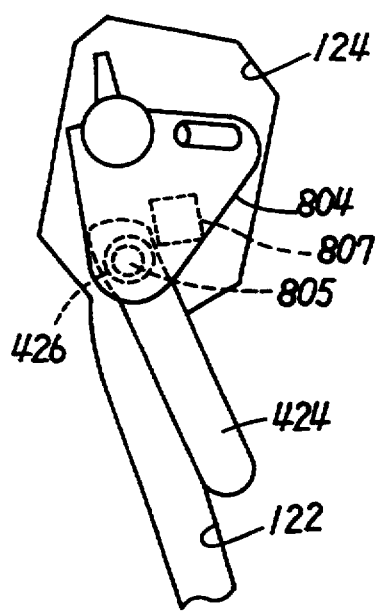
FIGS. 28A and 28B are plan views illustrating the leading guide block as attached to the link mechanism with the catcher removed from the chassis.
Figure 28B:
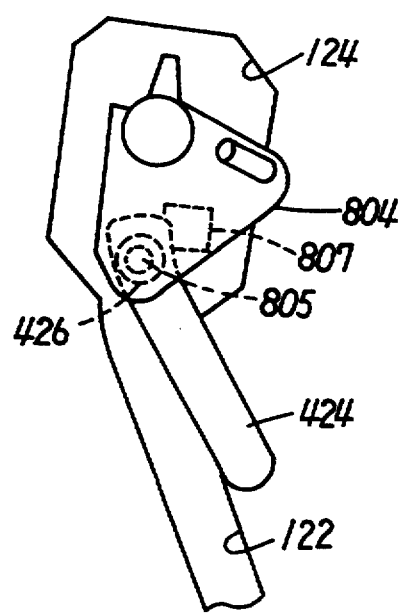

In this case, the catcher 806 is removed first to open a window 124 at the front end of the guide groove 122 covered with the catcher 806. As shown in FIG. 28A, the guide block 804 is rotated counterclockwise about the pin 805 within the window 124, and the pin 805 is fitted into the short sleeve 426 in such a position that the forward end of the link plate 424 will not interfere with the support piece 807 of the block 804. As seen in FIG. 28B, the guide block 804 is rotated clockwise about the pin 805 to contact the support piece 807 with the lower surface of the link plate 424. The block 804 is then returned to the rear end of the guide groove 122 by rotating the drive gear 320a, and the catcher 806 is thereafter attached to the chassis 100. The link plate 424 is supported at its forward end by the support piece 807 and is therefore unlikely to slip off from the pin 805.

Figure 29A:
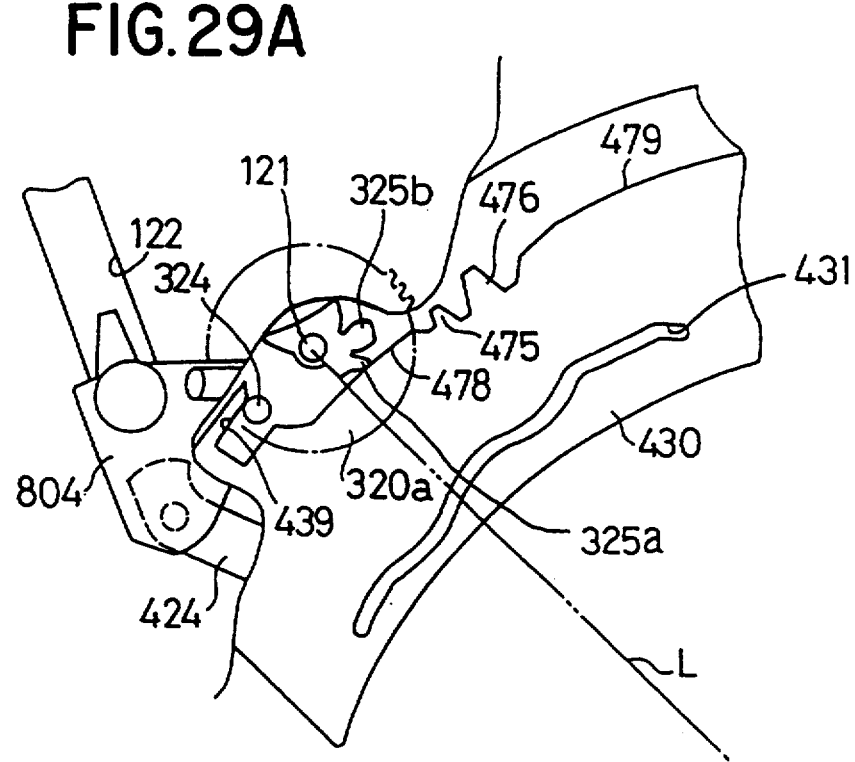
FIGS. 29A and 29B are views partly broken away and showing the operational relationship between the control slide and the drive gear.

Positioning Leading Guide Block (see FIG. 29A)

In this state, the control slide 430 is attached to the rear side of the chassis 100 so as to be positioned over the drive gear 320a.

As shown in FIG. 29A, a small rack tooth 475 meshable with the small tooth of the drive gear 320a is provided on the upper side of the control slide 430 at a left end portion thereof to the front of the cam groove 431. The slide has a large rack tooth 476 positioned at the right of and adjacent to the small rack tooth 475 and meshable with the large tooth 325b of the gear 320a. These rack teeth 475, 476 are formed on the same pitch circle. A first circular-arc wall 478 centered about the point P is provided at the left of the small rack tooth 475. A second circular-arc wall 479 centered about the point P is formed at the right of the large rack tooth 476. A retaining wall 439 having an open right end is formed at the left of the first circular-arc wall 478 continuously therewith.

The control slide 430 is so attached to the chassis 100 that the pin 324 of the drive gear 320a is in contact with the inner side of the retaining wall 439 with the tip of the small tooth 325a in contact with the first wall 478. The contact of the pin 324 with the wall 439 prevents the gear 320a from rotating in such a direction that the block 804 withdraws the tape in EJECT mode. The tip of the small tooth 325a is in contact with the first circular-arc wall 478 on the right side of a phantom line L through the shaft 121 and the pin P. Thus, the first wall 478 and the retaining wall 439 prevent the gear 320a from rotating in the tape withdrawing direction.

Even if the control slide 430 is displaced toward the rotary cylinder 800 along the phantom line L, the contact of the top of the small tooth 325a with the first wall 478 restrains the drive gear 320a from rotating in the tape withdrawing direction. Even if the control slide 430 becomes displaced toward the reel supports 200a, 200b along the line L, the contact of the pin 324 with the retaining wall 439 restrains the gear 320a from rotating in the tape withdrawing direction. The drive gear 320a is restrained from rotating in the tape withdrawing direction by the contact of the guide block 804 with the terminal end of the guide grooved portion 122 of the chassis 100.

Figure 29B:
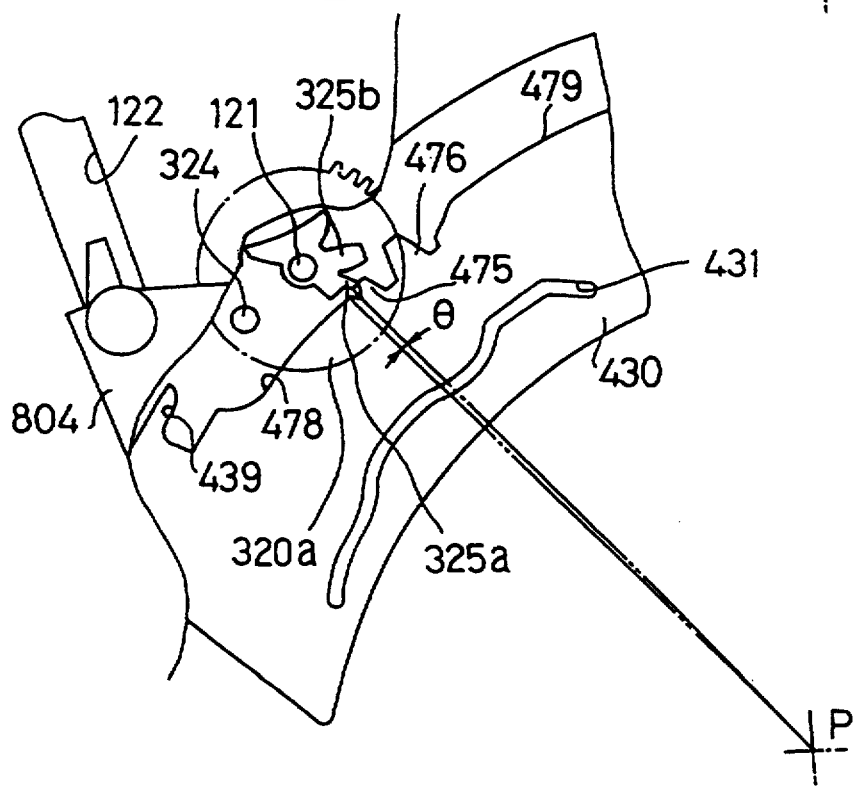
Figure 30:
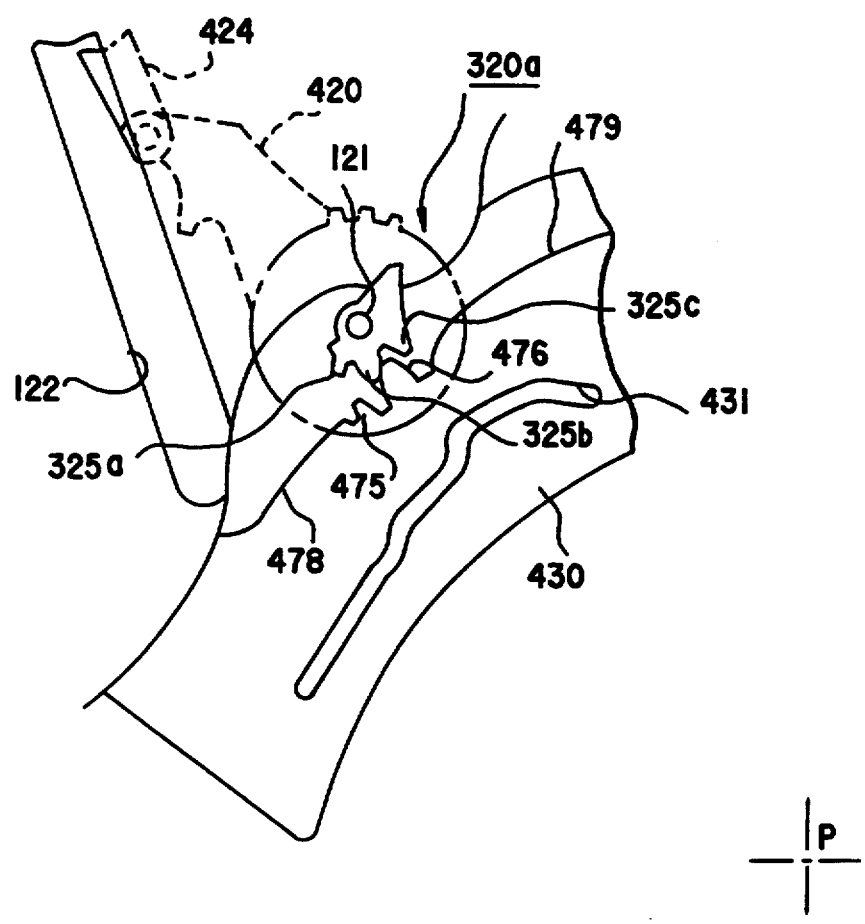
FIG. 30 is a view partly broken away and showing the operational relationship between the control slide and the drive gear upon the leading guide block completing tape loading.
Figure 33:
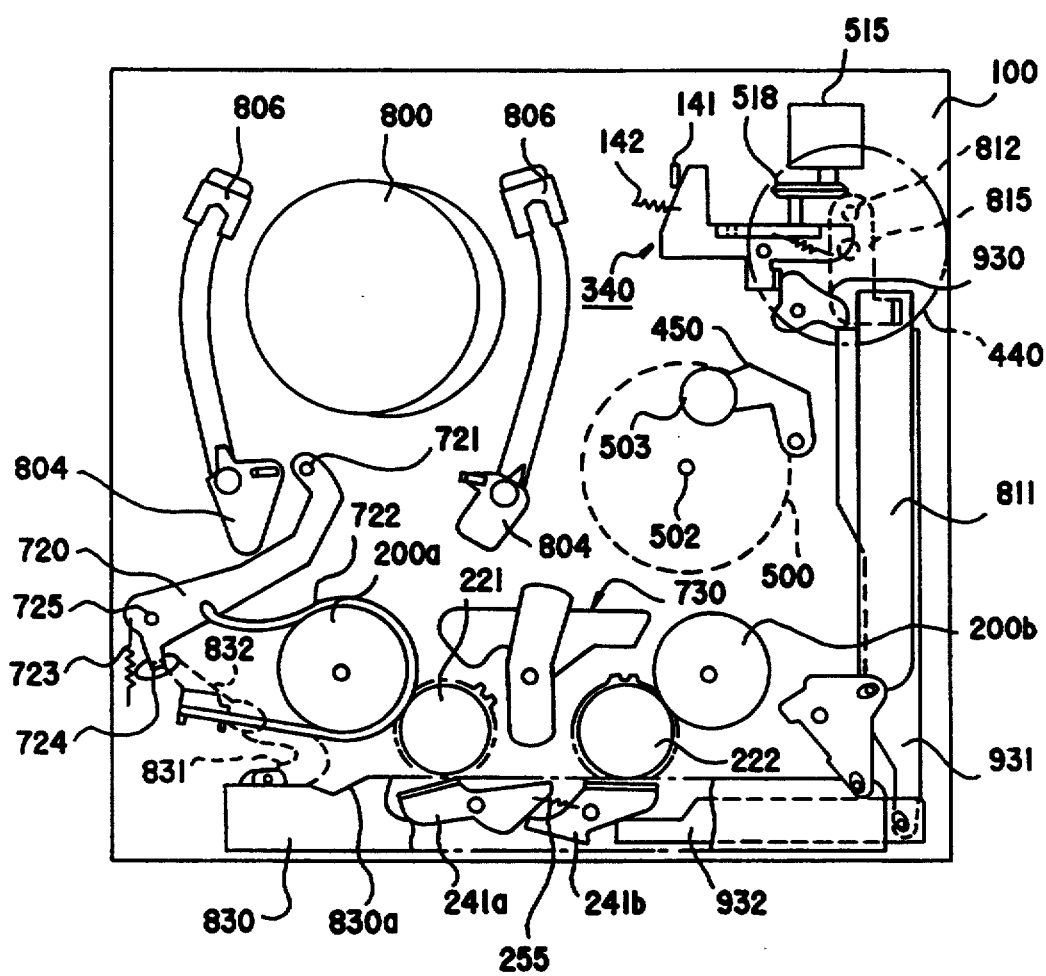
FIG. 33 is a plan view of a conventional recording-reproduction apparatus.
Figure 34:
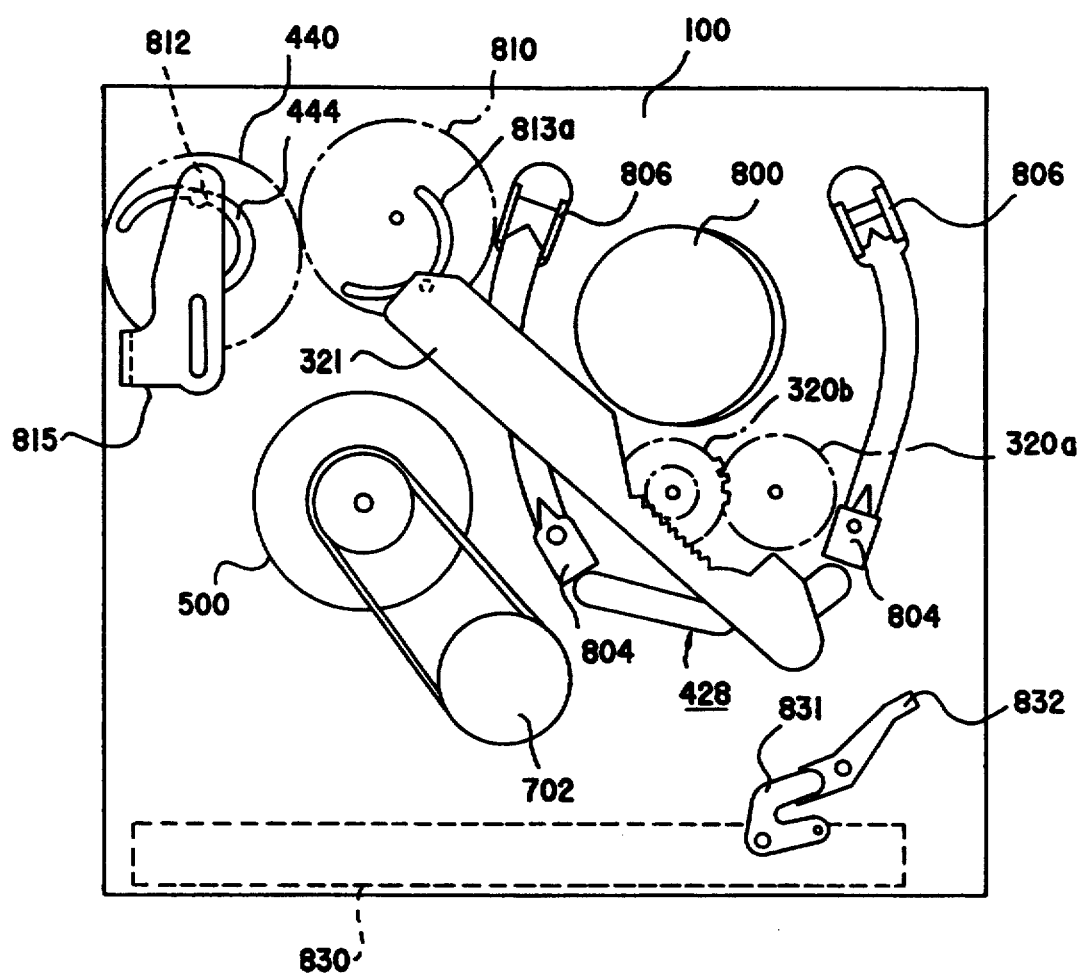
FIG. 34 is a rear view of the same.
Figure 35:
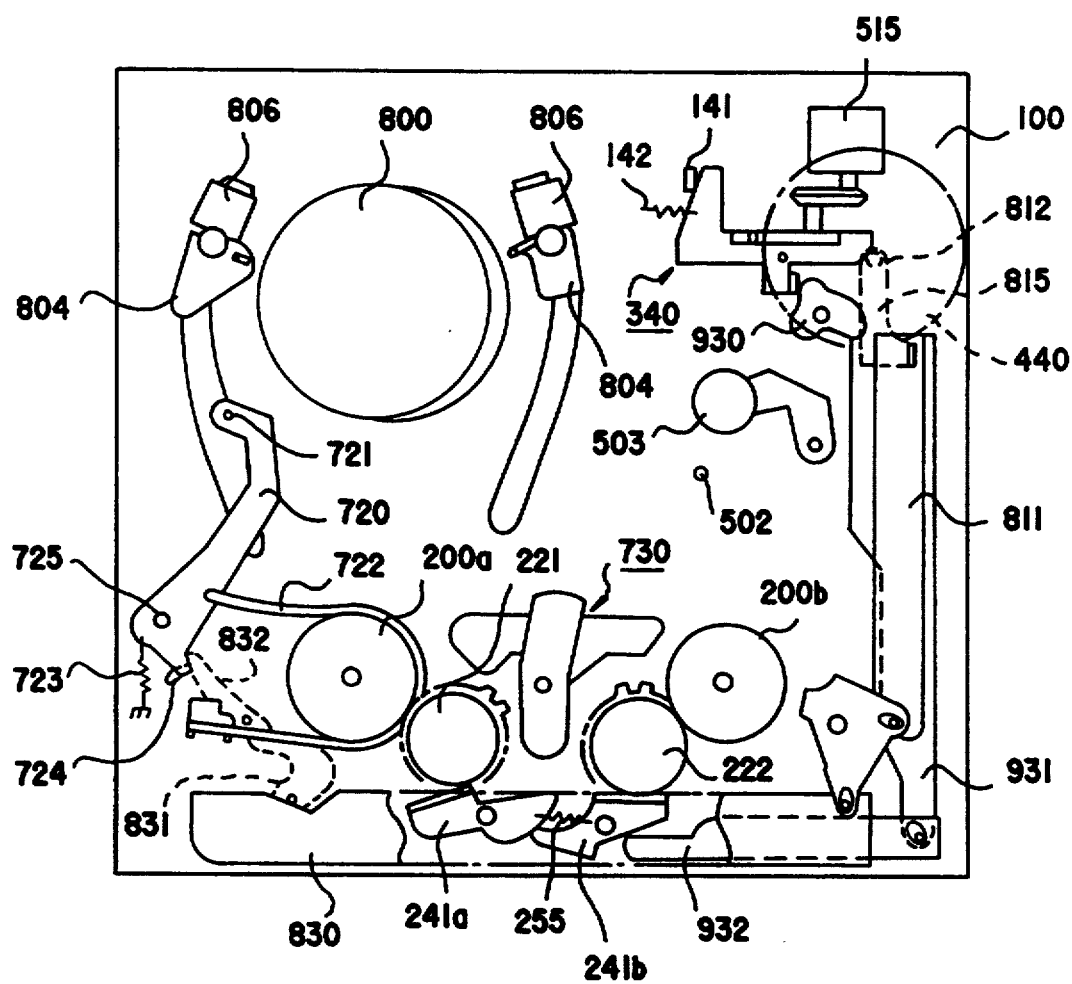
FIG. 35 is a plan view of the same in STOP mode.
Figure 36:
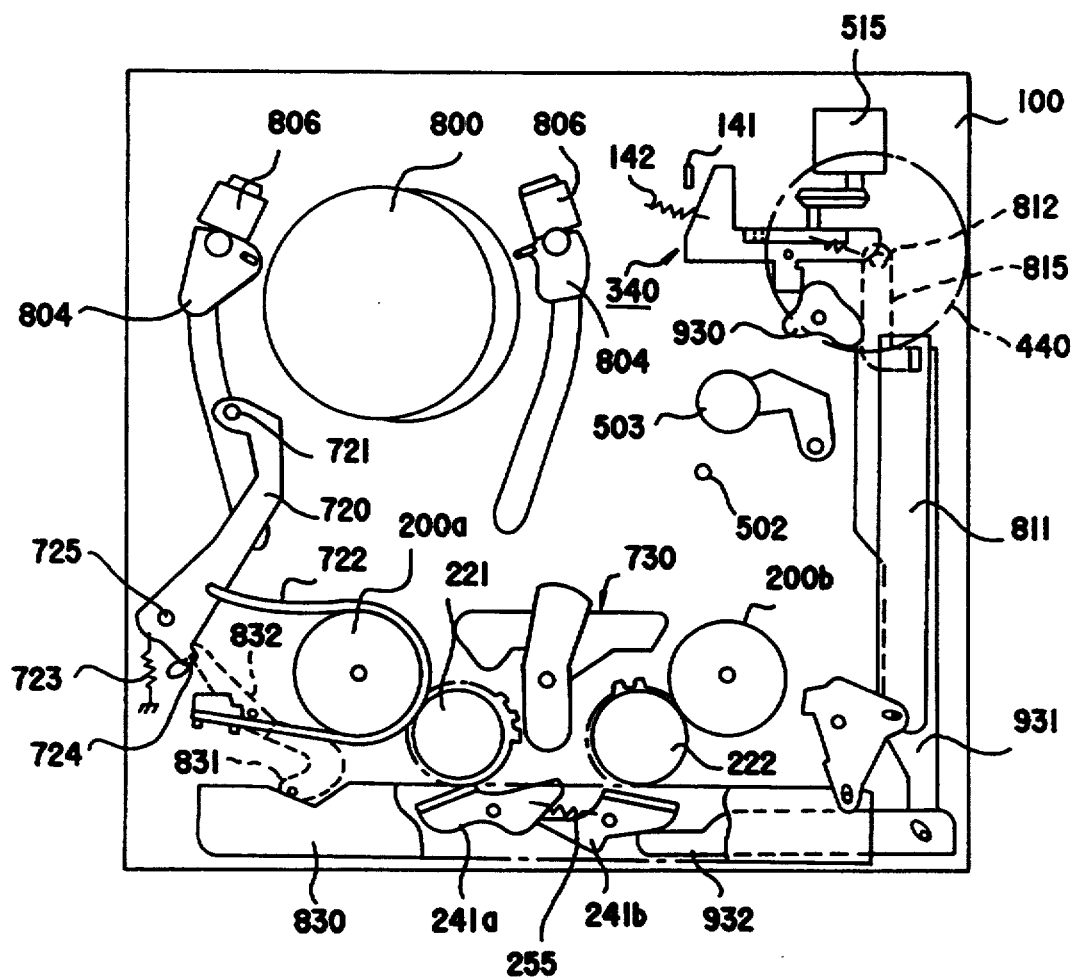
FIG. 36 is a plan view of the same in FF/REW mode.
Figure 37A:
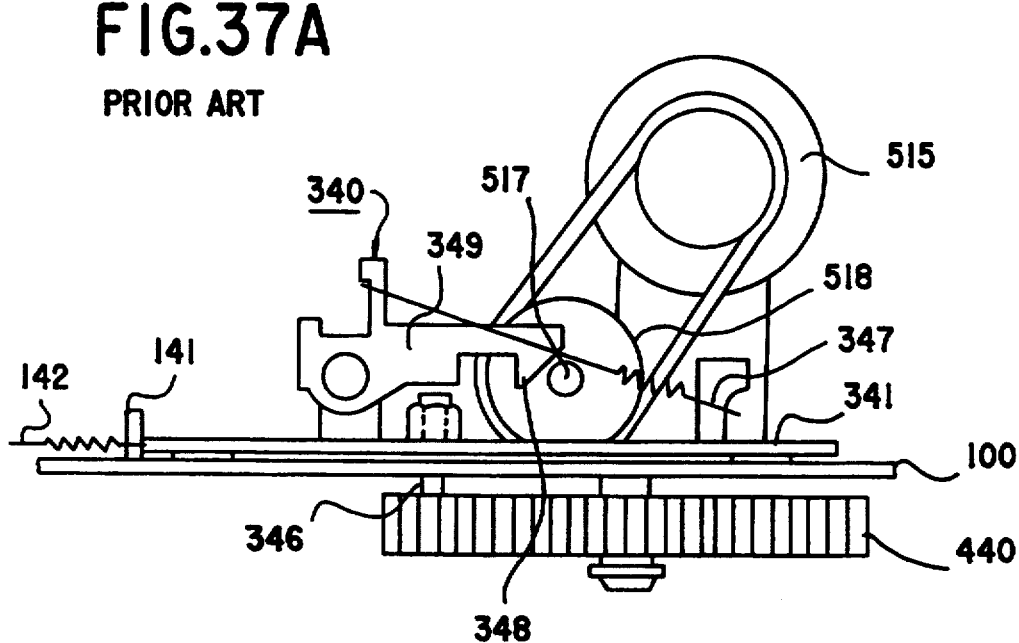
FIGS. 37A and 37B are front views showing the operation of a clutch unit of the same.
Figure 37B:
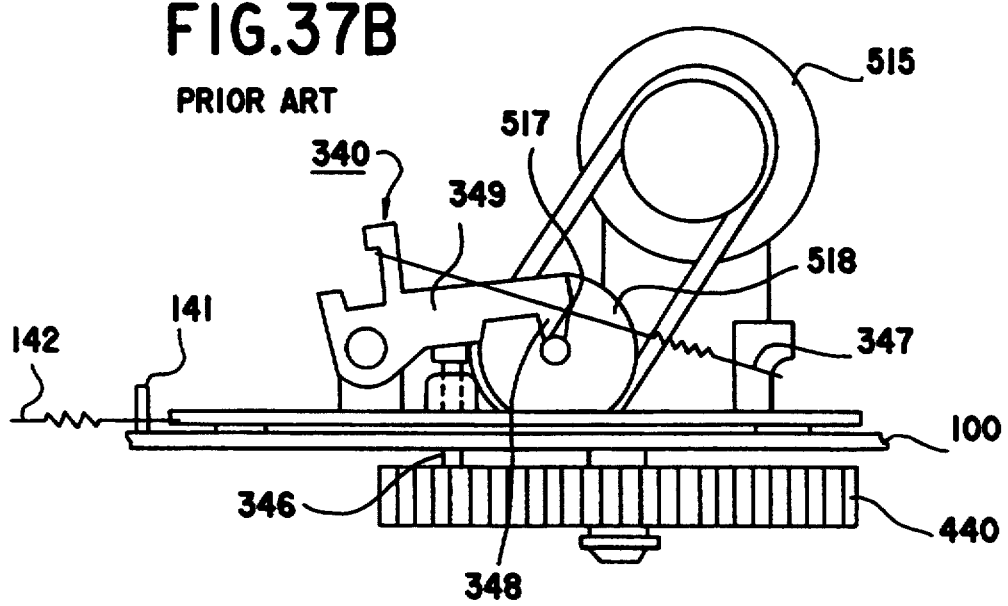
Figure 38A:
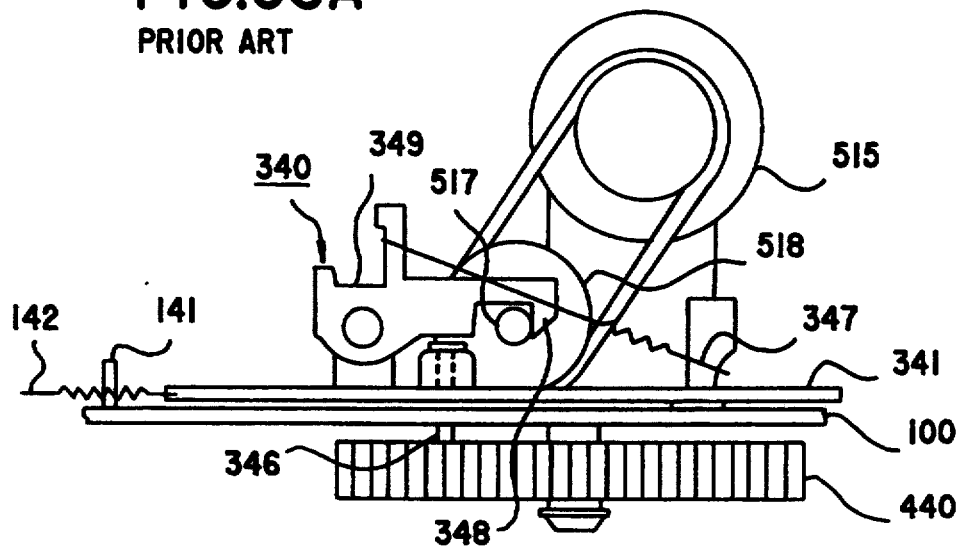
FIGS. 38A and 38B are front views showing the operation of the clutch unit of the same.
Figure 38B:
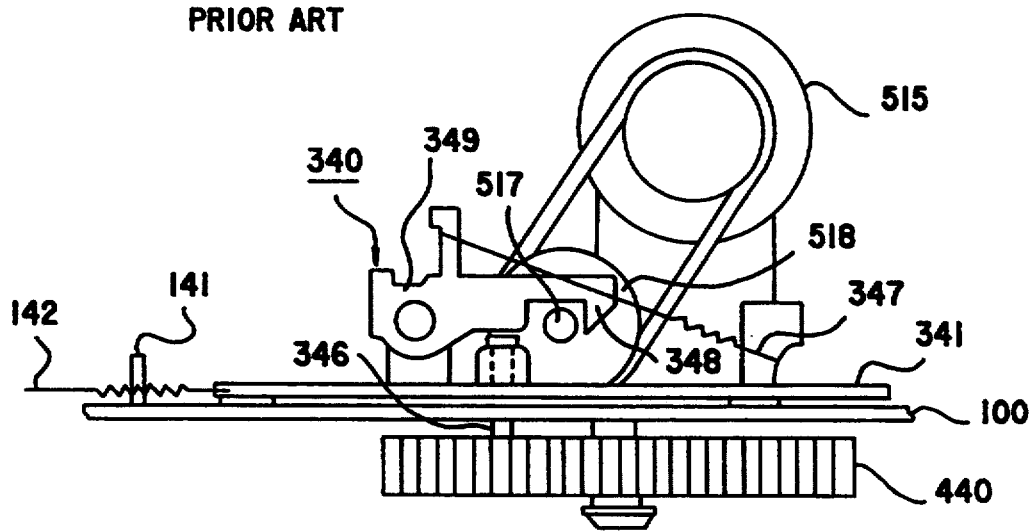

Loading by Leading Guide Block (see FIGS. 29A, 29B and 30)

For tape loading by the leading guide block 804, the control slide 430 is moved counterclockwise. The pin 324 is released from the retaining wall 439, and the tip of the small tooth 325a of the drive gear 320a from the first circular-arc wall 478. As shown in FIG. 29B, the small tooth 325a engages with the small rack tooth 475 of the control slide 430. The counterclockwise sliding movement of the slide 430 rotates the gear 320a in the tape withdrawing direction, and the guide block 804 slidingly moves toward the catcher 806.

Upon the disengagement of the small tooth 325a from the small rack tooth 475, the large tooth 325a engages with the large rack gear 476 as shown in FIG. 30. In this state, the guide block 804 is in contact with the catcher 806, restraining the pivotal plate 420 and the link plate 424 from rotation as seen in FIG. 31A. The sliding of the slide 430 causes the large rack tooth 476 to push the large tooth 325, further rotating the drive gear 320a toward the tape withdrawing direction. As shown in FIG. 31B, the pin 324 of the gear 320a moves within the circular-arc slot 422 to stretch the tension spring 421. In this state, the guide block 804 is pressed against the catcher 806 by the resilient restoring force of the spring 421.

In this case, the pressure of the guide block 804 on the catcher 806 is a value obtained by dividing the torque TL given by the spring 421 to the pivotal plate 420 by the perpendicular distance L from the center of rotation of the gear 320 to the lengthwise direction of the link plate 424. On the other hand, the torque TG required for rotating the gear 320 is given by the spring load multiplied by the perpendicular distance RT1. As previously described, the distance LT1 is greater than the distance RT1, so that the torque TG is smaller than the torque TL.

With reference to FIG. 29B, the meshing engagement between the gear and the rack usually involves a backlash θ. However, if θ is great, the drive gear 320a and the control slide 430 backlash relative to each other. This produces a difference between the loading start position of the guide block 804 and the unloading completion position thereof. It is therefore likely that the time required for loading will differ from the time required for unloading even if the slide 430 slidingly moves at a constant speed. To eliminate the likelihood, the small tooth 325a is engaged with the small rack tooth 475 at the loading start position of the guide block 804 for diminution of the backlash θ, and the large tooth 325b is engaged with the large rack tooth 476 at the loading completion position where the gear 320a and the slide 430 are subjected to a load to make these components withstand an excess of load.

When the control slide 430 further moves counterclockwise, the tip of the large tooth 325b comes into contact with the second circular-arc wall 479 to hold the block 804 pressed against the catcher 806.

(Unloading)

For unloading, the control slide 430 is slidingly moved rightward from the state in which the block 804 is pressed against the catcher 806, rotating the drive gear 320a in the tape returning direction. The projection 324a moves within the slot 422 and is pressed against the end 422a of the slotted portion 422 by the tension spring 421. The leading guide block 804 is retracted toward the cassette loaded position along the guide groove 122 for the completion of unloading.

In the foregoing description, the drive gear 320a and the tension lever 720 are driven by the control slide 430 which is rotated about the phantom point P, whereas the construction described is of course applicable also in the case where the drive gear 320a and tension lever 720 are rotated, for example, by a control member which is slidable straight.

Features of the Embodiment

The recording-reproduction embodying the invention has the following advantageous features.

1. The control slide 430 is in the form of a circular arc and rotatable about the point P, so that even if the slide is given an increased length of sliding stroke, the size of the chassis 100 need not be so increased as is required for a straight sliding movement. This meets the demand for compacting the recording-reproduction apparatus. Since the bulging side of the control slide is directed toward the rotary cylinder 800, the swing idlder 700, pulley 702 and like means for driving the reel supports 200a, 200b can be arranged on the curving-in side. This ensures effective use of the space provided by the chassis 100.

2. The control slide 430 is slidingly moved by the projections 471, 472 which are alternately engaged in the respective cam grooves 741, 745 of the drive cam gear 740. The control slide 430 can therefore be given a greater length of sliding stroke than when the slide is moved by the engagment of the projection 471 only in the cam groove 741.

During the sliding movement of the control slide 430, the toothed projection 473 is meshed with the pinion 746. This mitigates the load on the cam groove 741, rendering the slide 430 smoothly slidable.

3. In EJECT mode, the tip of the small tooth 325a is in contact with the first circular-arc wall 478 at a position closer to the guide block retracting side than a phantom line L through the central point of rotation of the drive gear 320a and the point P of rotation of the control slide 430, with the retaining wall 439 in contact with the pin 324. Accordingly, even if the engagement between the drive gear 320a and the slide 430 becomes displaced perpendicular to the direction of sliding movement of the slide 430, the first circular-arc wall 478 or retaining wall 439 restrains the gear 320a from rotating in the guide block withdrawing direction. This enables the block 804 to be positioned inside the cassette 600 with good stability.

4. When the leading guide block 804 starts to load the tape, the small tooth 325a of the drive gear 320a meshes with the small rack gear 475 of the control slide 430 with a diminished backlash. When the guide block 804 is pressed against the catcher 806, the large tooth 325b of the drive gear 320a is in mesh with the large rack tooth 476 of the control slide 430. This reduces variations in the position of the guide block 804 when the block starts loading, and enables the gear 320a to withstand the force with which the block 804 is pressed against the catcher 806.

5. The tension lever 720, withdrawing lever 350, brake lever 521, soft brake lever 251 and tension regulator 940 are operated by the control slide 430 meshing with the drive cam gear 740. Accordingly, these parts respond to the movement of the drive cam gear 740 quickly to ensure exquisite operation timing control.

6. The brake lever 241b is operated by the movement of the pivotal lever 715 about the pivot 715, so that when the lever 715 is to be spring-biased away from the reel support 200b, one end of the tension spring 716 can be positioned close to the pivot 712 to diminish the amount of stretch. This mitigates the impact force to be exerted on the stopper 171.

The stopper 171 can be disposed at a desired position within the range of rotation of the pivotal lever 715. The stopper 171 can therefore be provided at such a position that the impact load on the stopper 171 is small and will not produce an impact noise which sounds disagreeable. Accordingly, the stopper 171 need not be covered with a shock absorbing material to attenuate the impact noise to be produced by the operation of the instantaneous brake. This reduces the number of components.

7. The spring 723 for biasing the tension lever 720 is stretched to the greatest extent in SLOW or PLAY mode, while the control lever 330 so rotates as to compress the spring 723 for a change-over to FF/REW mode or EJECT mode. Accordingly, burden on the control slide 430 for changes of mode can be diminished, rendering the slide 430 smoothly movable.

8. The distance LT1 from the center of the drive gear 320a to the direction of application of the spring load to the spring retainer 423 is greater than the distance RT1 from the center of the drive gear 320a to the direction of application of the spring load to the projection 324a. Consequently, the torque TG for rotating the drive gear 320a when the guide block 804 comes into contact with the catcher 806 is smaller than the torque TL to be given to the pivotal plate 420. This reduces the load on the control slide 430 for rotating the drive gear 320a.

9. The forward end of the link plate 424 attached to the guide block 804 is supported by the support piece 807, so that the link plate 424 can be prevented from being removed from the guide block 804 even if the chassis 100 is subjected to vibration or impact.

The present invention is not limited to the foregoing embodiment in construction but can modified variously with the scope of the invention as defined in the appended claims.

What is claimed is:

1. A magnetic recording-reproduction apparatus comprising a loading mechanism having a drive gear and a link mechanism for slidingly moving a leading block to withdraw a magnetic tape from a cassette and wind the tape around a rotary cylinder, a pair of supply and take-up reel supports for winding up the magnetic tape, a tape tensioning mechanism for imparting tension to the magnetic tape according to the mode of travel of the tape, a control slide movable to positions corresponding to different modes of travel of the tape for operating the tape tensioning mechanism, a back tension mechanism for giving a rotational load to the supply reel support while the magnetic tape is in travel, and an instantaneous brake mechanism for operating brake levers when FF/REW mode is changed over to STOP mode to give a braking load to the reel supports, the recording-reproduction apparatus being characterized in that the control slide is generally in the form of a circular arc bulging toward the rotary cylinder and slidable along the plane of a chassis to perform a circular motion approximately about a point P, a drive mechanism for drivingly rotating the reel supports and the brake levers being arranged on the curving-in side of the control slide.

2. A recording-reproduction apparatus as defined in claim 1 wherein the control slide is formed on a surface thereof with projections spaced apart from each other and a toothed projection with sidewise directed teeth, and a drive cam gear formed with cam grooves for the respective projections to fit in is provided on a path of movement of the control slide, each of the cam grooves extending from an outer peripheral opening of the drive cam gear toward the center thereof, the toothed projection being meshable with the drive cam gear to assist in a cam action while the control slide is sliding with the projection fitting in the cam groove, the other projection being engageable in the cam groove at a position where the toothed projection disengages from the drive cam gear.

3. A recording-reproduction apparatus as defined in claim 1 wherein the drive gear is provided generally on the same pitch circle with a small tooth and a large tooth disposed on one side of the small tooth toward a direction of withdrawing the leading guide block, and the control slide is provided with a small rack tooth meshable with the small tooth while the slide is in sliding movement and a large rack tooth disposed at one side of the small rack tooth and meshable with the large tooth, the large rack tooth being meshable with the large tooth for rotating the drive gear to press the guide block into contact with a catcher disposed at a withdrawing completed position.

4. A recording-reproduction apparatus as defined in claim 1 wherein the control slide is formed with a cam groove having an inner cam face, and the cam groove has engaged therein a soft brake lever for giving a light load to the take-up reel support during playback of the magnetic tape, a brake lever for lightly braking a capstan motor for transporting the magnetic tape for slow reproduction and still frame reproduction, a tension regulator for lightly braking the take-up reel support for fast forwarding and withdrawing lever for withdrawing the magnetic tape from the cassette when the magnetic tape is to be loaded by the leading guide block, the engaged levers being operable by a circular-arc motion of the control slide.

5. A recording-reproduction apparatus as defined in claim 3 wherein the drive gear has a pin on a surface thereof, and the control slide is provided with a circular-arc wall having a radius of curvature extending from the point P and with a retaining wall projecting into a path of movement of the pin, the tip of the small tooth of the drive gear being adapted to contact the circular-arc wall at a position closer to a guide block retracting side than a phantom line L through the center of rotation of the drive gear and the point P while the guide block is standing by within the cassette, the drive gear being restrained by the retaining wall from rotating in the direction of withdrawing the guide block.

6. A recording-reproduction apparatus as defined in claim 1 which further comprises a sensor switch in operative relation with the control slide for producing a detection signal upon detecting a mode of travel of the magnetic tape to determine the position of the control slide, and a pinch lever having a pinch roller for transporting the magnetic tape as held between a capstan shaft and the roller, the sensor switch and the pinch lever being arranged in the vicinity of a path of movement of the control slide.

7. A recording-reproduction apparatus as defined in claim 1 wherein the back tension mechanism comprises a tension lever having at a forward end thereof a tension pin for contact with the magnetic tape and pivotably supported at a base end thereof on the chassis, a band wound around the reel support and attached at opposite ends to the tension lever, a control lever pivotably supported by the chassis, coupled to the control slide and in contact with the base end of the tension lever, and a tension spring for biasing the tension lever so as to tension the band, the control lever being operatively connected to the control slide to rotate the tension lever in a band slackening direction when PLAY mode and SLOW mode of the magnetic tape is changed over to another mode.

8. A recording-reproduction apparatus as defined in claim 1 wherein the instantaneous brake mechanism comprises a pivotal lever movable about a pivot on the chassis and biased by a spring so as to move a free end thereof away from the brake lever, a latch lever pivotably supported at a base end thereof on the pivotal lever and an operation lever supported on the chassis by the same pivot as the pivotal lever, one of a forward end of the latch lever and the free end of the operation lever being provided with a projection, with the other provided with a hook free to engage with or disengage from the projection, and when the pivotal lever rotates against the spring with the hook in engagement with the projection, an operating end of the pivotal lever comes into contact with the brake lever to move the brake lever away frown the reel support, the pivotal lever being movable into pressing contact with a stopper under the action of the spring when the operating end is out of contact with the brake lever with the latch lever disengaged from the projection, the stopper being disposed within the range of rotation of the pivotal lever.

9. A recording-reproduction apparatus as defined in claim 1 wherein the drive gear of the loading mechanism comprises a gear portion meshing with the control slide, a boss projecting from an eccentric position on an upper surface of the gear portion and a projection provided at one side of the boss, a tension spring being wound around the boss and engaged at one end thereof with the projection and at the other end thereof with a spring retainer on the link mechanism, the tension spring being stretchable by the rotation of the drive gear to cause the link mechanism to press the leading guide block against a withdrawing completed position, the boss being so formed that a perpendicular distance $LT1$ from the center of rotation of the drive gear to the direction of application of the spring load to the spring retainer is greater than a perpendicular distance $RT1$ from the center of rotation of the drive gear to the direction of application of the spring load to the projection.

10. A recording-reproduction apparatus as defined in claim 9 wherein the link mechanism has the spring retainer and comprises a pivotal plate having the drive gear attached thereto, and a link plate pivoted to a free end of the pivotal plate and having the leading guide block fitted thereto, a support piece projecting from the guide block and supporting a forward end of the link plate thereon.

* * * * *